United States Patent [19]

Schubert et al.

[11] 3,924,816

[45] Dec. 9, 1975

[54] APPARATUS FOR FORMING WINDINGS ON ROTORS OF ELECTRIC MOTORS OR THE LIKE

[75] Inventors: Klaus Schubert, Bottrop; Klaus Grohmann, Dusseldorf, both of Germany

[73] Assignee: Robert Krups, Solingen-Wald, Germany

[22] Filed: Apr. 10, 1974

[21] Appl. No.: 459,689

Related U.S. Application Data

[63] Continuation-in-part of Ser. No. 218,783, Jan. 18, 1972, abandoned.

[30] Foreign Application Priority Data

Jan. 19, 1971 Germany............................ 2102354

[52] U.S. Cl............. 242/7.05 B; 29/205 D; 29/598; 242/7.11
[51] Int. Cl.² ......................................... H02K 15/09
[58] Field of Search...... 29/598, 596, 205 D, 205 R, 29/605; 242/7.03, 7.05 B, 7.05 R, 7.05 C, 7.05 A, 7.11; 81/426

[56] References Cited
UNITED STATES PATENTS

| | | | |
|---|---|---|---|
| 643,061 | 2/1900 | Hukriede | 81/426 X |
| 2,212,801 | 8/1940 | Torbert | 81/426 |
| 2,779,886 | 1/1957 | Hunsdorf | 29/596 |
| 3,685,119 | 8/1972 | Geber | 29/205 D |
| 3,713,209 | 1/1973 | Biddison | 29/598 |
| 3,812,570 | 5/1974 | Mason | 29/205 D |

*Primary Examiner*—Carl E. Hall
*Attorney, Agent, or Firm*—Michael S. Striker

[57] ABSTRACT

Apparatus for winding several rotors for electric motors or the like in a simultaneous operation has a row of equidistant winding stations and an endless chain conveyor which transports sets of fresh rotors to the winding stations and simultaneously removes freshly wound rotors from such stations. The rotors at the winding stations are automatically clamped and indexed at selected intervals preparatory to formation of discrete windings. The conveyor supports movable caps which shield the commutators of rotors at the winding stations during the formation of discrete windings but allow for the placing of conductors over hooks provided on the commutators prior to formation of the first winding and upon completed formation of each subsequent winding.

38 Claims, 24 Drawing Figures

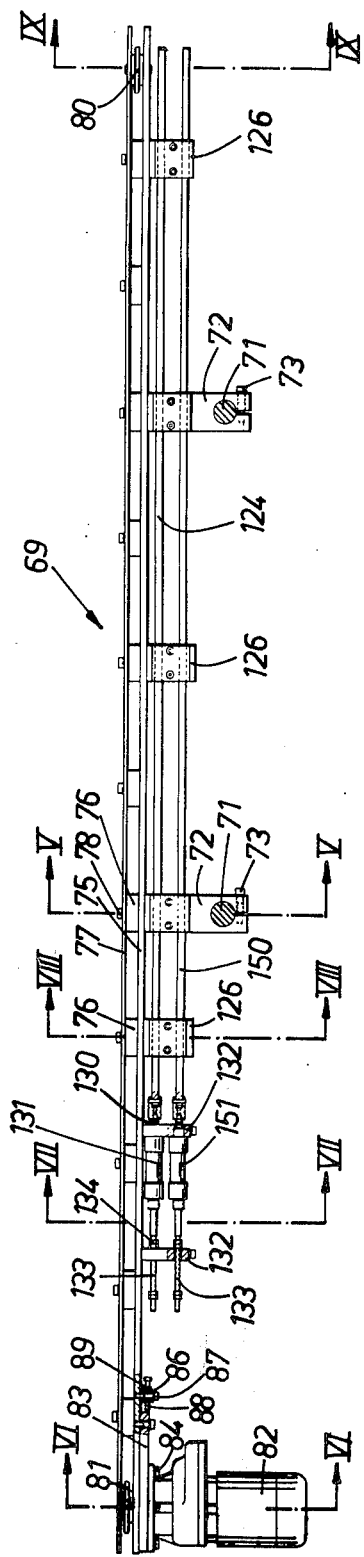
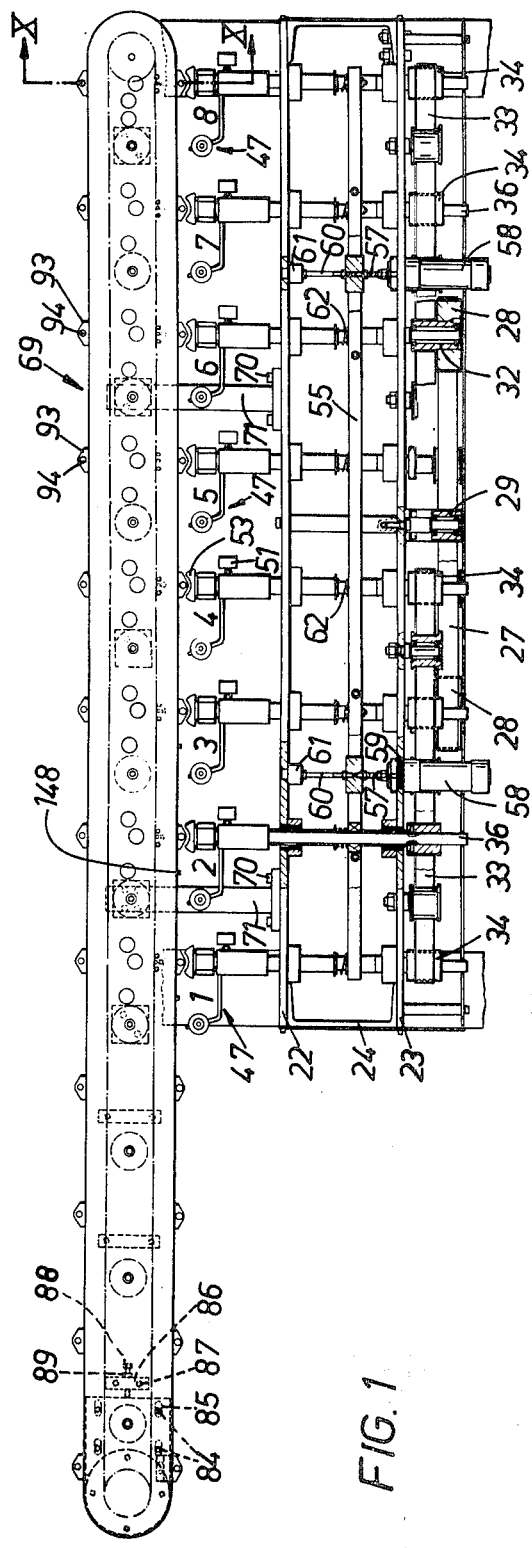

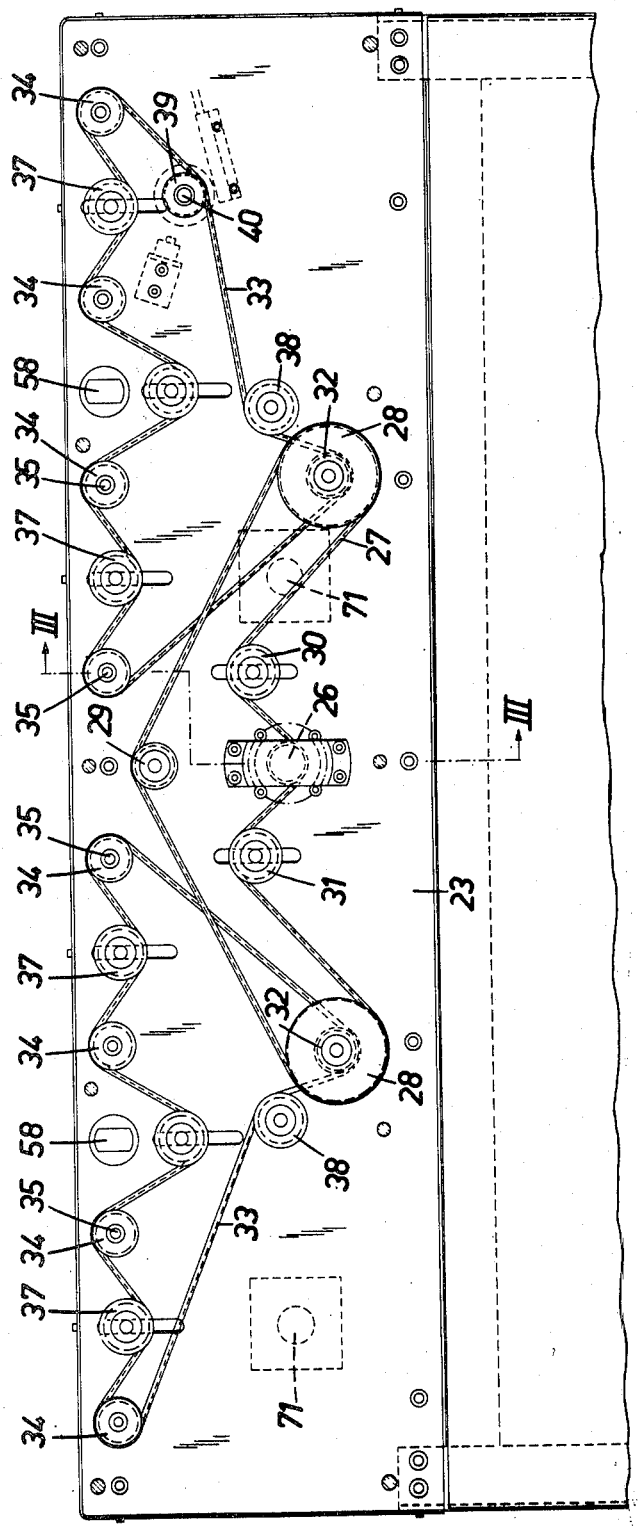

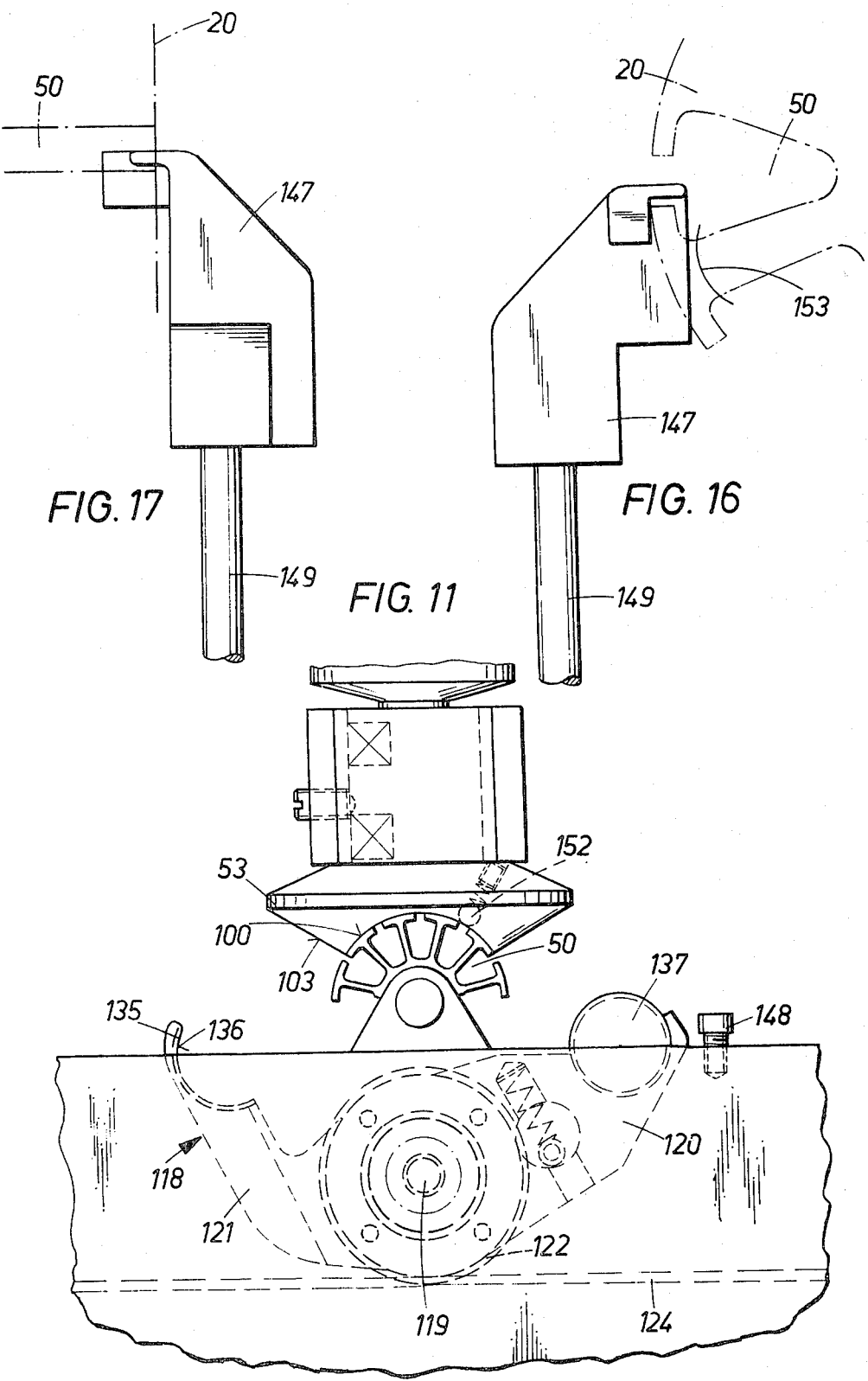

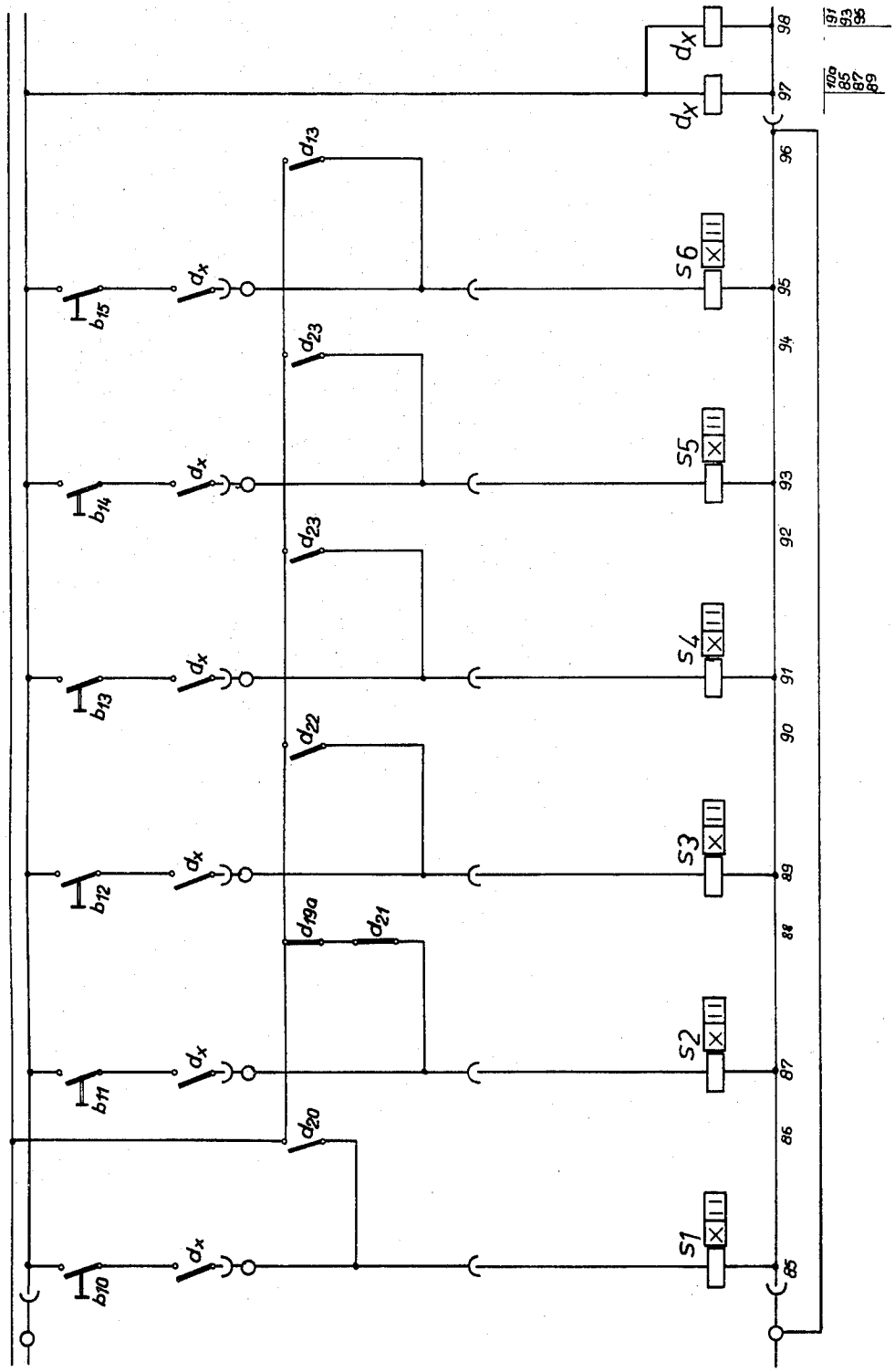

APPARATUS FOR FORMING WINDINGS ON ROTORS OF ELECTRIC MOTORS OR THE LIKE

CROSS-REFERENCE TO RELATED APPLICATION

The present application is a continuation-in-part of our prior copending application Ser. No. 218,783 filed on Jan. 18, 1972, now abandoned.

BACKGROUND OF THE INVENTION

The present invention relates to improvements in methods and apparatus for forming windings on rotors or armatures of electric motors or the like.

It is already known to provide successive rotors for electric motors with a desired number of discrete windings which extend into slots provided in the peripheral surfaces of the rotors. It is also known to form the windings on rotors which are provided with commutators and to place the conductors over suitable retainers on the commutators prior to formation of the first discrete winding and upon completed formation of each subsequent winding.

In presently known winding apparatus, the rotors are transported seriatim to a single winding station by means of a conveyor which resembles a turnstile with four prongs. The conveyor is turnable through angles of 90° and is provided with receptacles for rotors, one on each of the four prongs. The prongs are caused to dwell first at a combined loading and unloading station where a freshly wound rotor is removed from the receptacle to be replaced with a fresh rotor, and thereupon to the aforementioned single winding station where the rotors are provided with a desired number of windings. The combined loading and unloading station is normally located diametrically opposite the winding station. Wedges or like plugging elements are driven into the slots of a freshly treated rotor at a third station which follows the winding station and precedes the combined loading and unloading station. The latter station is provided with means for clamping a rotor and for indexing the thus clamped rotor upon completion of successsive windings.

A drawback of the just described conventional apparatus is that they can wind only a single rotor at a time. Since a single attendant is normally capable of supervising and servicing several winding stations, it is customary to mount several winding apparatus close to each other so that they can be supervised by a single person. The cost of winding is rather high and the output is low because each apparatus is capable of treating only one rotor at a time.

SUMMARY OF THE INVENTION

An object of the invention is to provide a novel and improved method according to which a plurality of rotors can be wound in a simultaneous operation so that the number of rotors which can be wound per unit of time can be increased to a multiple of the output of apparatus which are operated in accordance with conventional methods.

Another object of the invention is to provide a novel and improved apparatus which can wind substantial numbers of rotors in a simultaneous operation so that its output is much higher than the output of aforedescribed conventional apparatus.

A further object of the invention is to provide an apparatus which, even though capable of simultaneously winding a large number of rotors, can be supervised by a single attendant which can also supervise one or more additional apparatus.

Another object of the invention is to provide the winding apparatus with novel clamping, centering, orienting and indexing means for a large number of rotors.

Still another object of the invention is to provide the winding apparatus with novel and improved means for supplying wire-like conductors to a plurality of winding stations and for synchronizing the operation of all winding devices which are employed to simultaneously form discrete windings on a substantial number of rotors.

An ancillary object of the invention is to provide the improved winding apparatus with novel conveyor means for treated and untreated rotors.

An additional object of the invention is to provide the winding apparatus with novel means for severing conductors upon completion of simultaneous winding of a plurality of rotors.

One feature of the present invention resides in the provision of a novel and improved method of applying windings to rotors of electric motors or the like, and more particularly to rotors of the type having angularly spaced peripheral slots for receptaion of convolutions of wire-like conductors. The method comprises the steps of transporting a plurality of rotors to a plurality of discrete winding stations, simultaneously forming windings on the rotors at the winding stations so that the treatment of all such rotors is started and completed at the same time, and thereupon removing the thus treated rotors from the winding stations. In accordance with a presently preferred embodiment, the method further comprises the step of transporting a second plurality of fresh rotors to the winding stations simultaneously with the removing step so that a fresh set of rotors is delivered to the winding stations simultaneously with completed removal of treated rotors. The rotors are preferably transported simultaneously along an endless path which may be defined by a simple endless link chain or the like. A first portion of such path is adjacent to the winding stations and the treated rotors are removed and fresh rotors introduced at a second portion of the path. The locus of removal of treated rotors from the path may but need not coincide with the locus of insertion of fresh rotors, depending upon the overall length of the path and on the number of working stations. If the path is long enough, two or more sets of fresh rotors can be held in readiness for transport to the winding stations.

The forming step preferably comprises providing each of the rotors at the winding stations with a plurality of discrete angularly offset windings and indexing the rotors through identical angles subsequent to formation of each discrete winding. The rotors at the winding stations may be clampingly engaged and held between stationary and yieldable (e.g., spring-biased) clamping surfaces. Such engaging step may further comprise placing all of the rotors at the winding stations into exact parallelism with and at predetermined (preferably identical) distances from each other. It is normally desirable to properly orient all of the rotors at the winding stations prior to the forming step so as to insure that selected slots of all of the rotors assume predetermined angular positions for reception of conductors.

Each rotor may be provided with a commutator having a plurality of hook-shaped or otherwise configurated retainers for convoluted conductors. The conductors are placed over the retainers of the respective commutators prior to formation of the first discrete winding and upon completed formation of each subsequent winding. The commutators may be shielded during the formation of windings to prevent engagement of conductors with the commutators while the conductors are being coiled onto the respective rotors. The windings are preferably formed by revolving arms which are provided at the winding stations and the shielding step preferably comprises shielding at least those sides of the commutators which face the respective arms so that the arms can perform orbital movements which, in the absence of shielding, would result in the placing of conductors onto the retainers of the respective commutators. When the commutators are shielded, the arms convolute the conductors and cause them to enter into selected slots of the respective rotors. The speed of the arms is preferably increased gradually to a normal operating or full speed during the initial stage of formation of discrete windings and such speed is gradually reduced shortly prior to completion of each discrete winding. This insures that the arms can be arrested in predetermined angular positions. All of the arms are preferably rotated at identical speeds by resorting to a single prime mover.

The conductors are preferably withdrawn from discrete sources of supply, one for each winding station. Each conductor is preferably gripped in a region located intermediate the source and the respective winding station upon completion of the forming step, i.e., upon completed formation of the desired number of discrete windings on the rotors which dwell at the winding stations. The conductors are preferably severed in automatic response to removal of freshly treated rotors from the winding stations, for example, by tearing the conductors in the regions where the conductors are gripped upon completed formation of a desired number of windings. The number of turns in each discrete winding can be varied at will.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a plan view of a winding apparatus which embodies the invention;

FIG. 2 is a fragmentary rear elevational view as seen in the direction of arrow 2 shown in FIG. 1;

FIG. 4 is a rear elevational view of a conveyor which forms part of the winding apparatus, the view being taken in the direction of arrow 4 shown in FIG. 1;

FIG. 11 is a fragmentary plan view of the conveyor, further showing a combined gripping and severing or tearing device for a wire-like conductor;

FIG. 16 is a plan view of a guide for conductors, one such guide being provided at each winding station;

FIG. 17 is a side elevational view of the guide shown in FIG. 16; and

FIGS. 18–24 depict a single control circuit for the control of the arrangement depicted in FIGS. 1–17.

DESCRIPTION OF THE PREFERRED EMBODIMENTS

Figure 3:
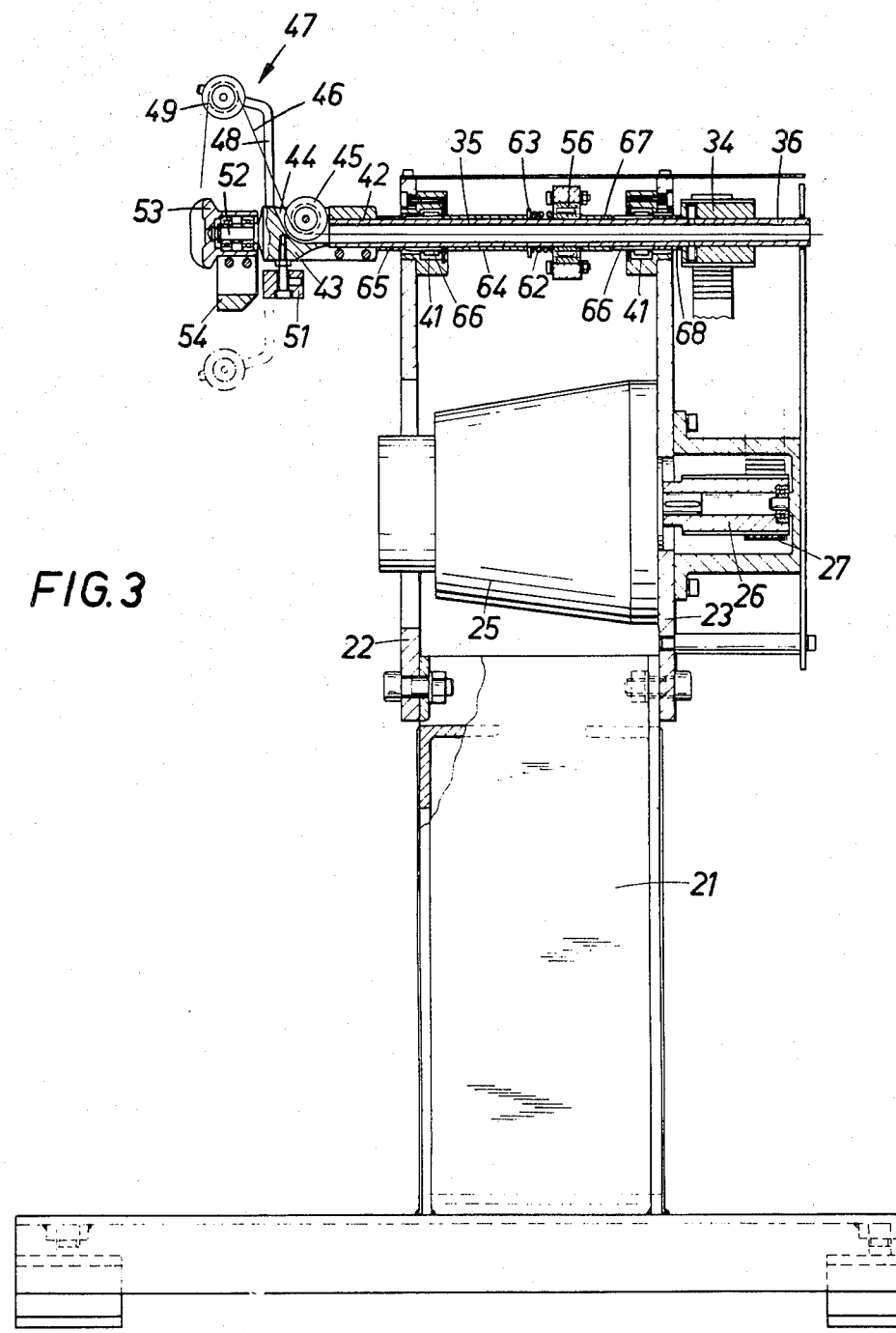
FIG. 3 is an enlarged fragmentary transverse vertical sectional view as seen in the direction of arrows from the line III—III in FIG. 2.

Referring first to FIGS. 1 to 3, there is shown an apparatus which is utilized to form windings on the rotors 20 for electric motors or the like. The rotors 20 are shown in FIGS. 10 to 14 and 16–17. The apparatus includes a series of eight winding or coil forming stations I, II, III, IV, V, VI, VII and VIII which, as shown in FIG. 1, form a row of equidistant stations.

The frame or housing of the apparatus includes a lower portion or base 21 (see particularly FIG. 3) which is movably or fixedly secured to the floor and supports an upper portion including two substantially plate like frame members or walls 22, 23 located in parallel vertical planes and connected to each other at the ends by transversely extending distancing members 24 of U-shaped profile (see FIG. 1). The main prime mover 25 of the apparatus is installed between the walls 22, 23 (FIG. 3) and its output shaft carries a driver gear 26 located behind the rear wall 23. The housing of the prime mover 25 is bolted to the wall 23. It is assumed that the prime mover 25 is a variable-speed polyphase motor with adjustable braking action, for example, a disk armature short-circuit rotor motor with braking action. The arrangement is preferably such that the rotor of the prime mover 25 is arrested in immediate response to opening of the motor circuit to thus automatically prevent any idling of the driver gear 26.

As shown in FIG. 2, the gear 26 drives a toothed endless belt 27 which is further trained over two intermediate gears 28 having their shafts mounted in the rear wall 23. The smooth external surface of the belt 27 is engaged by three guide rolls 29, 30 and 31 which insure that the teeth of the gears 26, 28, 28 mesh with a requisite number of teeth on the belt 27. The shaft of the guide roll 29 is fixedly mounted in the wall 23 but the shafts of the rolls 30, 31 are movable up and down (as viewed in FIG. 2) in slots 23a of the rear wall 23 to thus allow for adjustments in tension of the belt 27. The means for fixing the shafts of the rolls 30, 31 in selected positions is not shown in the drawing.

The intermediate gears 28 are coaxial with and rigidly connected with smaller gears 32 each of which serves to drive a discrete endless toothed belt 33. Each of the belts 33 serves to drive four equidistant driven gears 34 and its smooth external surface engages with a fixedly mounted guide roll 38 and with three adjustably mounted guide rolls 37 alternating with the respective driven gears 34. As shown in FIG. 2, the shafts of the guide rolls 37 are adjustable up and down in vertical slots 23b of the rear wall 23 to thus allow for adjustment of the tension of respective belts 33. The driven gears 34 serve to rotate hollow winding shafts 35, one for each of the winding station I to VIII. The shafts 35 are mounted in the walls 22, 23 in a manner to be described below. FIG. 3 shows that the rear end portion 36 of each shaft 35 extends rearwardly beyond the respective driven gear 34. As clearly illustrated in FIG. 2, the axes of the shafts 35 are disposed in a common horizontal plane rather close to the upper edge portions of the walls 22, 23. One of the belts 33 drives the shafts 35 at the winding stations I to IV, and the other belt 33 drives the shafts 35 at the winding stations V to VIII. All of the aforedescribed gears and rolls are located behind the rear wall 23 so that they are readily accessible, together with the three toothed belts 27, 33, 33. FIG. 2 further shows that the means for transmitting torque from the output shaft of the prime mover 25 (i.e., from the driver gear 26) to the shafts 35 at the winding stations I to VIII comprises a plurality of discrete components which are mirror symmetrical to each other with reference to a vertical plane including the axes of the driver gear 26 and guide roll 29. Such plane is located midway between the two median winding stations IV and V.

The guide rolls 37, 38 insure that the teeth of the corresponding belts 33 are in mesh with a requisite number of teeth on the respective gears 32 and 34. More particularly, the rolls 38 insure satisfactory engagement between the belts 33 and the corresponding gears 32, and the rolls 37 insure satisfactory engagement between the belts 33 and the respective gears 34. The means for fixing the shafts of guide rolls 37 in selected positions with reference to the wall 23 are not shown in the drawing. The right-hand belt 33 of FIG. 2 further drives a gear 39 for a horizontal control shaft 40. The toothed belts 27, 33, 33 insure that the control shaft 40 is invariably driven in synchronism with all of the shafts 35.

Referring again to FIG. 3, each hollow winding shaft 35 is rotatably and axially movably mounted in coaxial needle bearings 41 and 41' respectively provided in the walls 22 and 23. The front end portion 42 of each shaft 35 extends beyond the front side of the front wall 22 and is drivingly connected with a supporting member or head 43. Each head 43 is formed with a recess 44 for a guide roller or wheel 45 serving as a means for deflecting a wire-like conductor 46 which is fed through the respective hollow shaft 35 from a suitable source of supply 46A. Each head 43 further supports a radially outwardly extending winding or convoluting member or arm 47 which includes a suitably configurated (substantially L-shaped) carrier or bracket 48 for a second guide roller or wheel 49 mounted at its free end (i.e., at a point remote and radially spaced from the respective shaft 35). The carrier 48 may be made of relatively stiff wire or the like. When the winding arm 47 is caused to rotate by the respective hollow shaft 35, the conductor 46 which is fed thereto through the interior of the respective shaft 35 is being inserted into selected slots 50 of the rotor 20 at the corresponding winding station. The apparatus of the present invention preferably further comprises conventional tensioning and scanning devices for the conductors 46. Such devices are mounted between the rear end 36 of the respective shaft 35 and the corresponding source of supply 46A of conductor material (such sources are preferably in the form of bobbins or reels on which the conductors 46 are stored in convoluted form).

Each hand 43 on the front end portion 42 of the respective winding shaft 35 further supports an adjustable counterweight 51 which is mounted diametrically opposite the associated winding arm 47 and serves to balance the weight of the winding arm. Each head 43 is also provided with a forwardly extending projection or pin 52 for a rotatably mounted clamping or centering member 53. The latter serves to clampingly engage and to thereby center a rotor 20 at the respective winding station. When a clamping member 53 engages a rotor 20, it is held against rotation with the corresponding hollow shaft 35, i.e., the respective pin 52 can rotate in bearings (shown but not referenced in FIG. 3) which are interposed between the pin 52 and a sleeve-like portion of the respective clamping member 53. A weight or mass 54 is suspended on the clamping member 53 to normally maintain the latter in a predetermined normal or starting angular position shown in FIG. 3 (in which the weight 54 is located at a level directly below the member 53).

The shifting means for moving the hollow winding shafts 35 lengthwise in the respective needle bearings 41 and 41' comprises a horizontal shifting bar 55 which is disposed between the walls 22, 23 (see FIGS. 1 and 3). The bar 55 is provided with eight equidistant holes for ball bearings 56 which surround the respective hollow shafts 35 and allow these shafts to rotate and to move axially, i.e., at right angles to the plane of the bar 55. FIG. 1 shows that the shifting bar 55 is movable sideways (i.e., toward and away from the front wall 22) by means of two fluid-operated motors here shown as pneumatically operated cylinders 58. The pistons of these cylinders have piston rods 57 which are connected with the shifting bar 55. One of the cylinders 58 is mounted on the rear wall 23 between the winding stations II, III and the other cylinder 48 is mounted in similar fashion between the winding stations VI, VII. The housings of the cylinders 58 extend through holes 59 provided therefor in the rear wall 23. The shifting bar 55 is provided with two projections in the form of studs 60 each of which preferably registers with a different one of the piston rods 57 and extends forwardly, i.e., toward the front wall 22. The latter carries preferably adjustable stops 61 which determine the maximum extent of forward movement of the shifting bar 55. Instead of employing adjustable stops 61, the bar 55 can be provided with studs 60 of adjustable axial length so that the operator can select the length of working strokes of the pistons in cylinders 58 and hence the extent of sidewise movement of the shifting bar 55.

FIGS. 1 and 3 illustrate the shifting bar 55 in its forward end position in which the clamping members 53 are in engagement with rotors 20 at the respective winding stations (provided that such winding stations accommodate rotors 20 at the time when the shifting bar 55 is moved to its front end position). As shown in FIG. 3, each ball bearing 56 in the shifting bar 55 is located behind an energy storing helical compression spring 62 which surrounds the respective shaft 35 and whose front convolution abuts against a collar 63. Each collar 63 is provided at the rear end of a cylindrical sleeve 64 which surrounds the respective shaft 35 and extends all the way to the inner race 66 of the front needle bearing 41 (in the wall 22). The inner race 66 is disposed between the sleeve 64 and a second sleeve 65 which surrounds the respective shaft 35 and abuts against the corresponding head 43. Each shaft 35 is further surrounded by two additional sleeves 67, 68 the first of which is disposed between the respective ball bearing 56 and the inner race 66' of the rear needle bearing 41' (in the wall 23). The sleeve 68 is disposed between the inner race 66' and the respective driven gear 34. The springs 62 serve as elastic cushioning means which transmit pressure to the clamping members 53 when the shifting bar 55 is moved forwardly (toward the wall 22) in response to admission of a pressurized fluid into the rear chambers of the cylinders 58. The ball bearings 56 then move the shafts 35 forwardly by way of the springs 62, collars 63, sleeves 64, inner races 66 and sleeves 65. When the shifting bar 55 is being retracted to its rear end position (in response to admission of a pressurized fluid into the front chambers of the cylinders 58), the shafts 35 are being moved rearwardly by way of the respective ball bearings 56, sleeves 67, inner races 66' and sleeves 68. The purpose of the springs 62 is to insure that the clamping members 53 can be yieldably urged against the rotors 20 at the respective winding stations. It will be noted that the retraction of the shifting bar 55 results in simultaneous retraction of all eight shafts 35 to the same extent because the ball bearings 56 then bear against the sleeves 67 which cannot move axially of the respective shafts 35.

As shown in FIG. 1, the front wall 22 supports a conveyor 69 for rotors 20. The conveyor 69 is mounted on the wall 22 by two horizontal bolts 71 which are secured to the wall 22 by screws 70. The bolts 71 extend through holes provided in two downwardly extending brackets 72 of the conveyor 69. FIG. 4 shows that the lower end portions of the brackets 72 are slotted and are traversed by tightening screws 73 which cause the brackets to frictionally engage the respective bolts 71. The brackets 72 support an elongated horizontal confining plate 75 which is secured thereto by screws 74 (see FIG. 5). A second confining plate 77 is located above and is parallel to the plate 75. Distancing members 76 are disposed between the plates 75, 77 and the plate 77 is secured to the plate 75 and/or to distancing members 76 by screws 78.

The conveyor 69 further comprises a relatively simple and inexpensive endless link chain 79 which is mounted between the plates 75, 77 to travel in a horizontal plane. The chain 79 is trained over two sprocket wheels 80, 81 which are journalled in the respective end portions of the plates 75, 77. The sprocket wheel 81 is driven by an electric motor 82. The motor 82 can be of the variable-speed type or it may drive the sprocket wheel 81 through the intermediary of a variable-speed transmission. This motor has a flange 83 which is suspended at the underside of the lower plate 75 by screws 84. The stems of the screws 84 extend through elongated slots 85 (FIG. 1) of the plate 75 so as to allow for adjustments of the motor 82 and sprocket wheel 81 toward or away from the sprocket wheel 80 at the other end of the conveyor 69. The means for adjusting the position of the motor 82 with reference to the confining plates 75, 77 comprises a metallic strip 86 which is secured to the underside of the plate 75 by screws 87. The strip 86 has a horizontal tapped bore for an adjusting screw 88 the free end of which bears against the flange 83. The selected axial position of the adjusting screw 88 can be fixed by a lock unit 89. By rotating the screw 88, an operator can change the tension of the chain 79.

Figure 12:
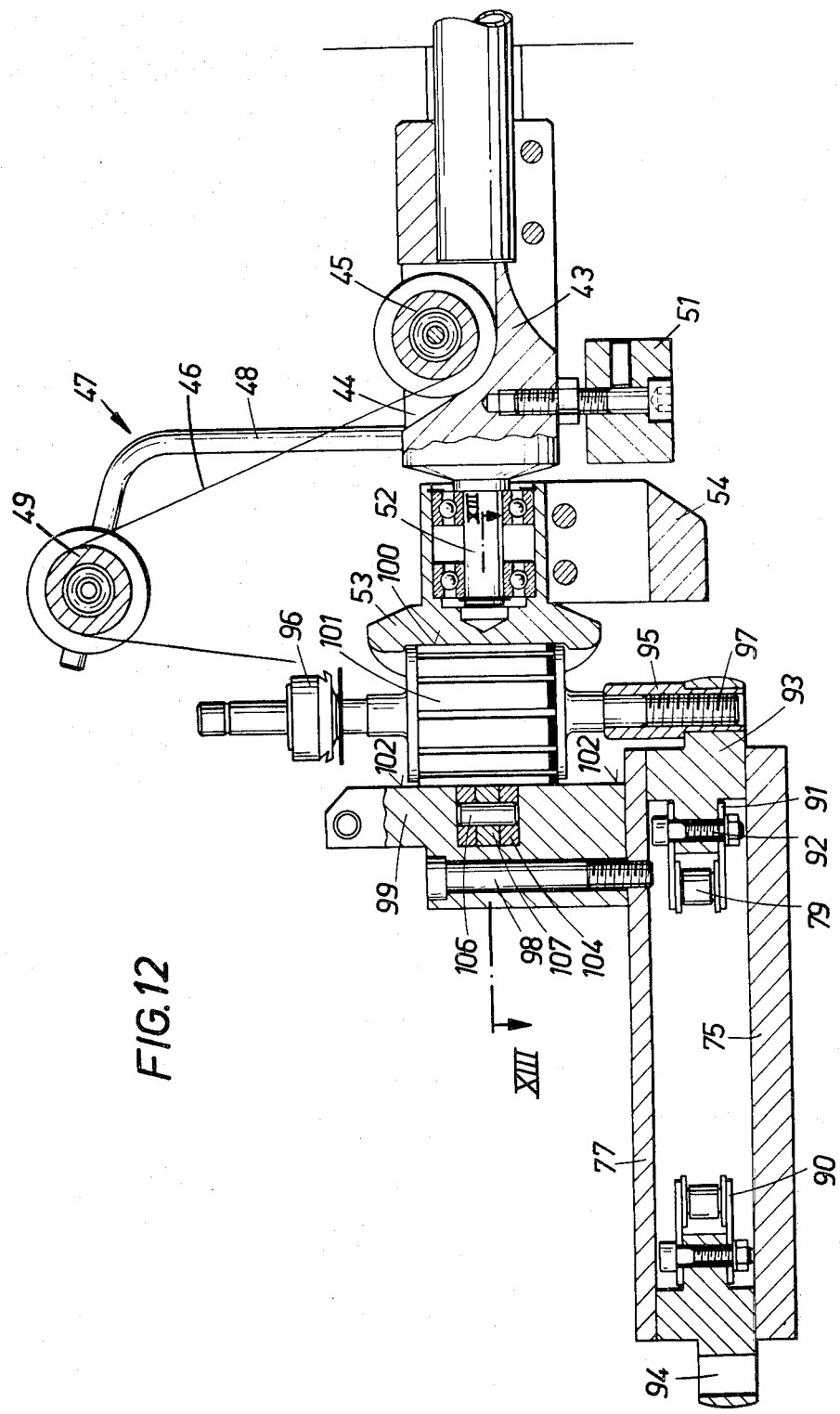
FIG. 12 is an enlarged fragmentary vertical sectional view of the parts at one of the eight winding stations shown in FIG. 1.
Figure 13:
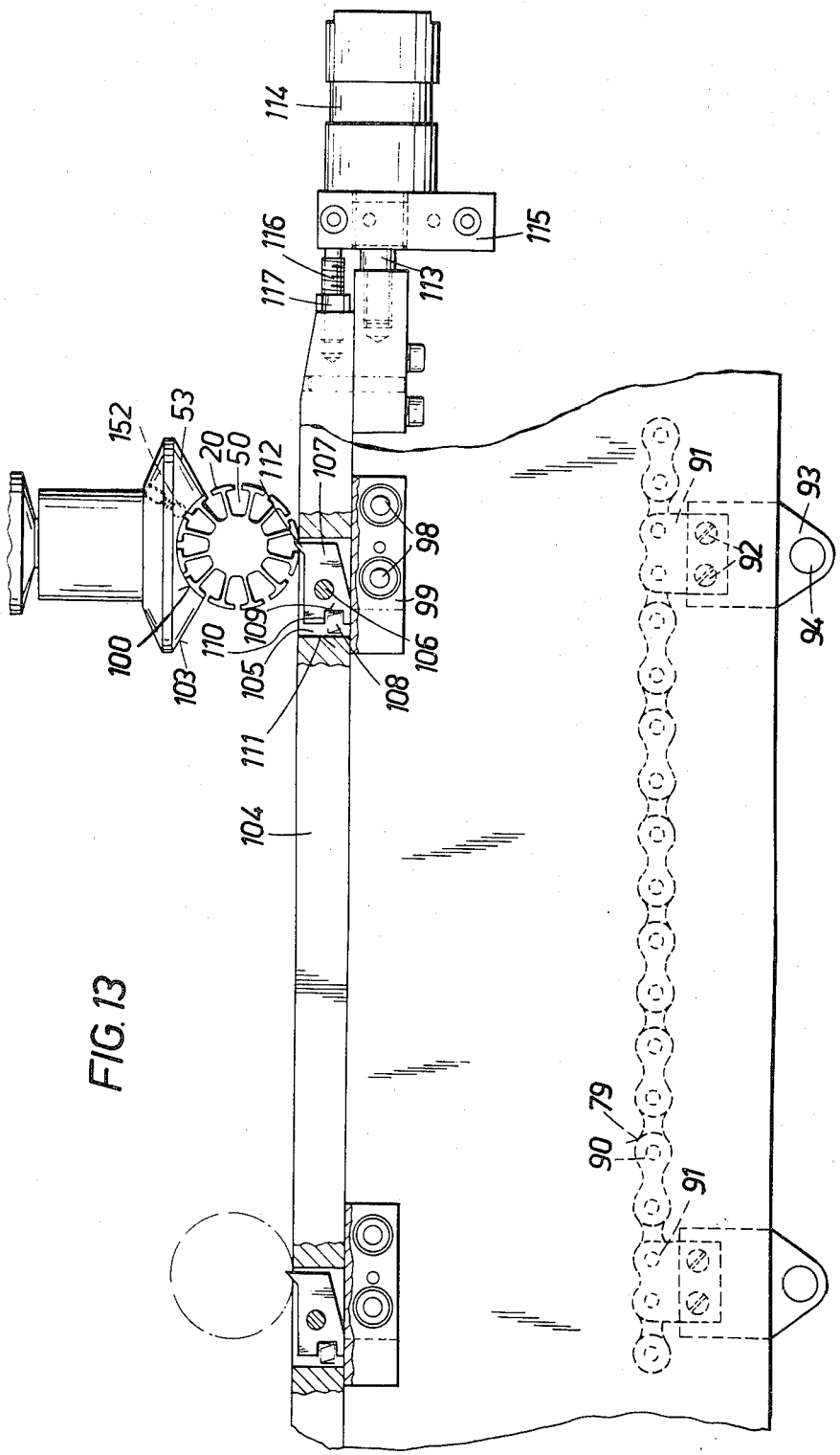
FIG. 13 is a horizontal sectional view as seen in the direction of arrows from the line XIII—XIII of FIG. 12.

The chain 79 comprises two straight parallel stretches which extend between the sprocket wheels 80, 81 and are located in a horizontal plane between the confining plates 75, 77. Thus, the plates 75, 77 automatically prevent undesirable sagging of the chain 79. Certain links 90 of the chain 79 are provided with outwardly extending projections or extensions 91 (see, for example, FIGS. 10, 12 and 13); in the illustrated embodiment, each sixteenth link 90 is provided with an extension 91. The shape of the extensions 91 is best shown in FIG. 13; each such extension 91 supports a holder 93 which is secured thereto by screws 92 and has a vertical hole or socket 94 for the lower end of the shaft 97 (see FIG. 12) of a rotor 20. FIG. 12 shows that the confining plates 75, 77 serve as ways wherein the holders 93 slide with minimal clearance to insure that the orientation of rotors 20 which are being transported to the winding stations I to VIII does not change appreciably when the chain 79 is in motion. The holder 93 extend outwardly beyond the plates 75, 77 so that their sockets 94 are readily accessible all the way around the plates for observation as well as for insertion or removal of rotor shafts 97. The sockets 94 of the holders 93 accommodate receiving means or bearing sleeves 95 for the shafts 97. The upper end portion of each shaft 97 is connected with a commutator 96 (see FIGS. 10 and 12). The bearing sleeves 95 are long enough to insure proper retention of rotors 20 during transport toward, at, and during transport beyond the winding stations. No additional supporting means for the rotors on the conveyor 69 are necessary; the shafts 97 are simply inserted into the sleeves 95 from above and the rotors come to rest in optimum positions for transport to the stations I to VIII.

The chain 79 of the conveyor 69 shown in FIG. 1 is provided with twenty-four equidistant holders 93, i.e., the number of holders is a whole multiple of the number of winding stations. When the chain 79 is brought to a standstill, eight successive holders 93 register with the winding stations and the remaining holders 93 are accessible for insertion or withdrawal of shafts 97. The distance between the axes of neighboring sockets 94 preferably equals or closely approximates the distance between the axes of neighboring winding shafts 35. The chain 79 is provided with three equidistant actuating members or trips 180 (see FIG. 1) each of which can actuate a switch 181 in the circuit of the motor 82 to thereby arrest the motor 82 when the chain 79 has been advanced through a distance which is required to place eight freshly inserted rotors 20 into register with the winding stations I to VIII. At the same time, the chain 79 has transported eight freshly treated rotors 20 away from the winding stations so that such finished rotors are ready for a further treatment or for manual or automatic detachment from the respective holders 93. The trips 180 insure automatic stop-page of the motor 82 whenever the chain 79 delivers to the winding stations I to VIII a fresh set of rotors 20.

As shown in FIGS. 12 and 13, the upper confining plate 77 of the conveyor 69 supports eight equidistant back supports 99 which are secured thereto by screws 98. Each back support 99 registers with one of the winding stations and serves as an abutment for a rotor 20 which is being pushed thereagainst by the corresponding clamping member 53 when the shifting bar 55 has been caused to move to its front end position nearest to the front wall 22. FIG. 12 illustrates one rotor 20 in proper position between the adjacent back support 99 and the respective clamping member 53. The front side of each clamping member 53 is provided with a recess or socket which is bounded by an arcuate surface 100 complementary to the adjacent portion of the cylindrical peripheral surface of the package of laminations 101 forming part of the rotor 20. The back support 99 has a flat rotor-engaging surface 102. When the shifting bar 55 is moved forwardly, the eight rotors 20 at the winding stations I to VIII are automatically biased against the surfaces 102 and are properly held by the respective clamping members 53 because the adjacent portions of peripheral surfaces of the laminations 101 extend into the recesses and engage the surfaces 100 of the members 53. As best shown in FIG. 11, the dimensions of surfaces 100 in the sockets or recesses at the front end faces of the clamping members 53 are selected in such a way that these sockets receive substantial portions of adjacent rotors 20, namely, they conceal the open outer ends of all such slots (numbered 50c) which are disposed between the two slots (marked 50a and 50b) which are in the process of receiving turns of the conductor 46. The surfaces 100 are flanked by suitably inclined flat and/or rounded guide faces 103 which are provided on the clamping members 53 and serve to direct the conductor 46 into the slots 50a, 50b when the respective winding arm 47 is caused to rotate about the axis of the associated shaft 35. In other words, the clamping members 53 not only cooperate with the back supports 99 to prevent undesirable changes in the orientation of rotors 20 at the respective winding stations but they also serve to insure the introduction of convoluted conductor 46 into selected slots 50a, 50b and to facilitate the entry of convolutions into such slots.

The distance between a pair of neighboring holders 93 on the chain 79 of the conveyor 69 corresponds substantially to the distance between the axes of a pair of neighboring winding shafts 35. However, since the chain 79 is preferably trained over the sprocket wheels 80, 81 with at least some slack, it is necessary to properly center the freshly introduced rotors 20 at the corresponding winding stations. Such centering is carried out automatically by the clamping members 53 whose surfaces 100 engage the adjacent portions of laminations 101 to thus insure that the axis of each rotor 20 intersects the axis of the respective winding shaft 35 when the shifting bar 55 has been moved to its front end position.

The eight back supports 99 are provided with cutouts which are machined into their flat surfaces 102 and serve to guide a reciprocable indexing bar 104 best shown in FIGS. 12 and 13. The indexing bar 104 is provided with eight cutouts 105, one for each winding station, and each cutout 105 accommodates an entraining or indexing pawl 107 which is pivotable about the axis of a vertical pin 106. As shown in FIG. 13, each entraining pawl 107 is biased by a helicaal spring 108 one end convolution of which bears against a surface 111 in the respective cutout 105 and the other end convolution of which bears against a bottom surface 109 in a notch 110 of the pawl 107. The pallets 112 of the entraining pawls 107 can extend from the respective cutouts 105 and into the neighboring slots 50 of rotors 20 at the respective winding stations.

The indexing bar 104 is reciprocable by a fluid-operated motor here shown as a pneumatic cylinder 114. The piston rod 113 of the piston in the cylinder 114 is secured to the indexing bar 104 and the cylinder 114 is mounted on a bracket 115 provided therefor on the upper confining plate 77 of the conveyor 69. When the cylinder 114 causes the piston rod 113 to move outwardly, the indexing bar 104 is shifted lengthwise with respect to the back supports 99 and the pallets 112 of the entraining pawls 107 are caused to move entirely into the respective cutouts 105 against the opposition of the springs 108. This is due to specific configuration of pallets 112 as clearly shown in FIG. 13, i.e., each pallet 112 has an inclined surface which rides over the adjacent portion of the rotor 20 when the indexing bar 104 is moved in a direction to the left, as viewed in FIG. 13. The leftward movement of the indexing bar 104 is terminated when the pallets 112 enter the next-following slots 50 of rotors 20 at the respective winding stations under the action of springs 108. When the indexing bar 104 is thereupon caused to perform a return stroke, namely, when the cylinder 114 retracts the piston rod 113, the bar 104 returns to the position shown in FIG. 13 and the pallets 112 of the entraining pawls 107 index the respective rotors 20 through such an angle that another pair of slots (50a, 50b in FIG. 11) is ready to receive convolutions of the conductor 46. The extent of rightward movement of the indexing bar 104 (as viewed in FIG. 13) is adjustable by a pin 116 which is externally threaded and extends into a tapped bore of the indexing bar. The selected axial position of the pin 116 can be fixed by a lock nut 117. The tip of the pin 116 abuts against the bracket 115 when the indexing bar 104 is returned to the right-hand end position shown in FIG. 13.

The cylinder 114 is actuated at spaced intervals and causes the piston rod 113 and indexing bar 104 to perform a forward and a return stroke in order to thereby index eight rotors 20 through a desired angle, namely, so as to place a pair of slots 50 into an optimum position for reception of convolutions at each of the eight winding stations. The adjustable pin 116 insures that the indexing bar 104 comes to rest in a position in which the rotors 20 at the eight winding stations are in optimum positions for introduction of convoluted conductors 46 into selected pairs of slots 50. The clamping members 53 are provided with detent means in the form of spring-biased balls 152 which partially penetrate into adjacent slots 50 to thus yieldably hold the rotors 20 in selected angular positions. The pallets 112 of the pawls 107 cooperate with the balls 152 to further insure safe retention of rotors 20 in optimum angular positions for winding.

The indexing bar 104 performs an additional important and advantageous function, namely, to properly select the initial angular positions of eight rotors 20 prior to the first winding operation. Thus, when the chain 79 has been caused by the motor 82 to advance through a distance which is necessary to remove eight freshly treated rotors 20 from the winding stations and to deliver eight fresh rotors 20 to such stations, the cylinder 114 cause the piston rod 113 to perform a forward and a return stroke so as to index all eight freshly delivered rotors 20 prior to start of the winding operation. This insures that each of the eight freshly delivered rotors 20 invariably assumes an optimum angular position in which the ball of the detent means 152 in the adjacent clamping member 53 extends into the nearest slot 50 and in which the inclined guide faces 103 of the clamping member 53 are ready to direct the conductor 46 into the selected slots 50a, 50b when the shaft 35 causes the respective arm 47 to begin the insertion of loops of conductor 46 into the slots 50a, 50b.

Figure 10:
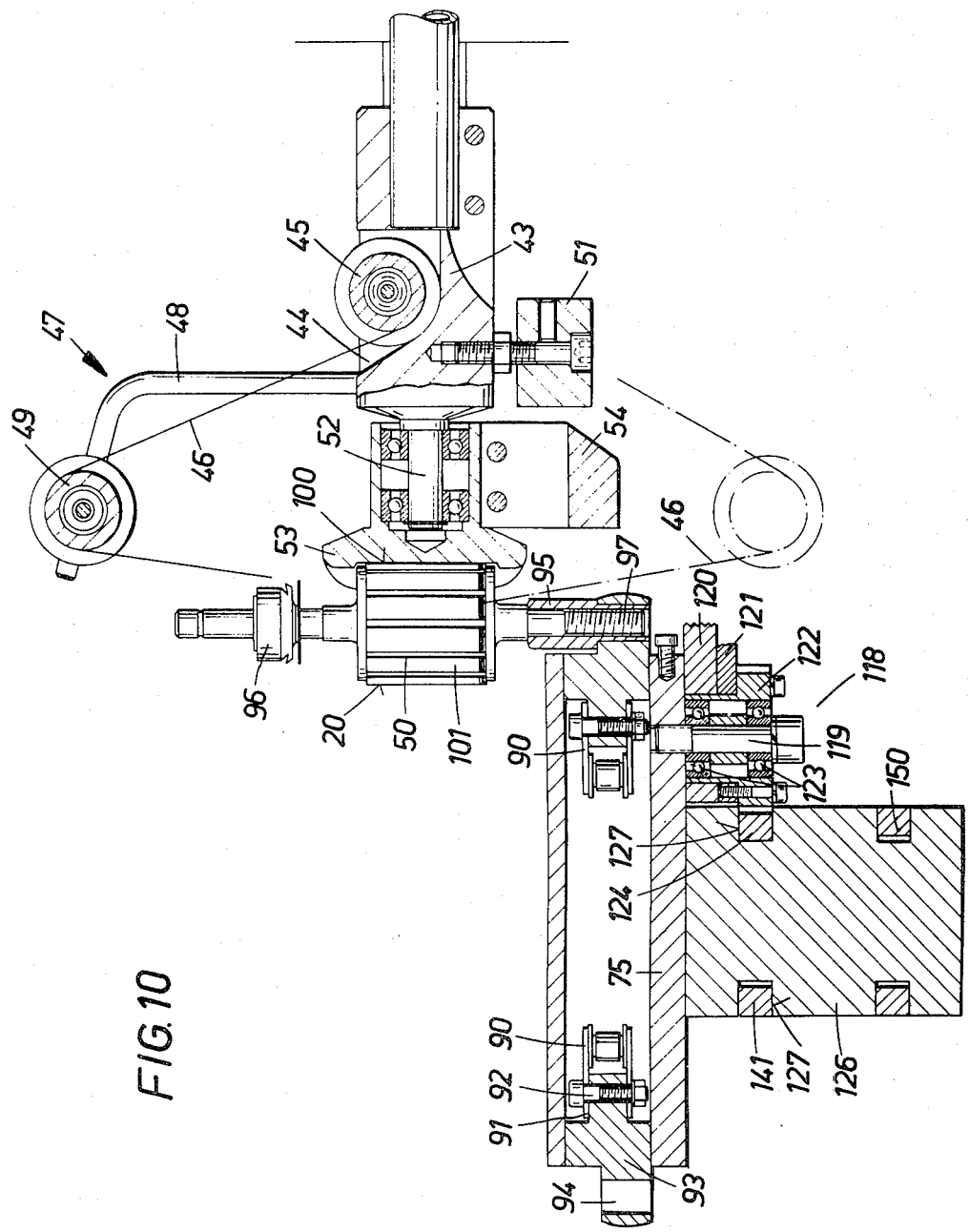
FIG. 10 is an enlarged fragmentary vertical sectional view as seen in the direction of arrows from the line X—X of FIG. 1.

Referring to FIGS. 10 and 11, the conveyor 69 supports eight intercepting and gripping devices 118 for conductors 46, one for each winding station. The gripping devices 118 are secured to the underside of the lower confining plate 75 by means of screws 119 or analogous fasteners. Each gripping device 118 comprises a fixed jaw 120 and a pivotable jaw 121; the latter is movable toward the respective fixed jaw 120 to thereby grip a conductor 46 therebetween. The pivotable jaw 121 of each gripping device 118 is secured to a pinion 122 which is rotatable on ball bearings 123 surrounding the respective fastener 119. Each fixed arm 120 is attached to the confining plate 75 in a manner not specifically shown in the drawing. The pinion 122 meshes with a toothed rack 124 which is common to all eight winding stations, i.e., the rack 124 meshes with a set of eight pinions 122. This rack is reciprocable in recesses 125 (FIG. 5) provided therefor in the brackets 72. The rack 124 is further guided in the recesses 127 of three blocks 126 which are secured to the underside of the confining plate 75. Cover plates 128 (see also FIG. 8) are provided on the brackets 72 and blocks 126 to overlie the recesses 125, 127; the plates 128 are secured to the parts 72, 126 by screws 129.

The rack 124 is secured to the piston rod 130 of the piston in a pneumatic cylinder 131 which is mounted on a bracket 132 at the underside of the confining plate 75 (see FIG. 4). The stroke of the piston rod 130 is adjustable by an externally threaded pin 133 which is provided with a lock unit 134 the same as described for the pin 116, lock nut 117 and bracket 115 of FIG. 13. When the cylinder 131 is actuated, the toothed rack 124 causes the pinions 122 to pivot the respective jaws 121 toward the associated fixed jaws 120 and to thereby clampingly engage the conductors 46 between the respective pairs of jaws 120, 121. As shown in FIG. 11, each pivotable jaw 121 is provided at its free end with a tapped half bore or recess 136 whose internal threads are shown at 135. The threads 135 can move into mesh with the external threads of a pin 137 which is provided at the free end of the respective fixed jaw 120.

The pin 137 is mounted at the free end of the respective fixed jaw 120 in such a way that about one-half of its externally threaded portion remains exposed. A conductor 46 which extends into the space between the jaws 120, 121 is thereby engaged by the exposed threads of the pin 137 and the threads 135 in the recess 136 when the jaw 121 is pivoted toward the jaw 120. This insures that the conductor 46 is engaged and gripped by the threads 135 and the external threads of the pin 137 to thus guarantee a highly reliable gripping action. As a rule, the threads 135 will urge the conductor 46 into the helical groove defined by the external threads of the pin 137. This reduces the likelihood of deformation of the conductor 46 in response to closing of the pivotable jaw 121. The sharp edges of threads on the pin 137 and jaw 121 insure that the conductor 46 breaks or tears in automatic response to forward transport of wound rotors 20 beyond the stations I to VIII. The threads of the pin 137 and jaw 121 further prevent any lengthwise and/or lateral slippage of the leading end of the conductor 46 after the conductor is severed in the region between the respective source 46A and the corresponding winding station in response to forward transport of eight wound rotors 20 beyond the last station VIII.

When the formation of windings on a set of eight rotors 20 is completed, the shafts 35 are arrested in such angular positions that the winding arms 47 extend downwardly. Consequently, the eight conductors 46 which extend from the respective sources 46A to the rotors 20 pass between the corresponding pairs of jaws 120, 121. The eight gripping devices 118 are thereupon actuated by the cylinder 131 so that the conductors 46 are gripped between the threads 135 of the jaws 121 and the threads on the respective pins 137. The motor 82 is thereupon started to drive the chain 79 whereby the rotors 20 move away from the winding stations and the conductors 46 are severed in the region of the respective pins 137 in such a way that the leading end of each conductor is safely held between the arms 120, 121 of the respective gripping device 118. Thus, the winding operation can begin anew as soon as the chain 79 completes the delivery of a set of eight rotors 20 to the winding stations. This will be readily understood since the devices 118 grip the conductors 46 while the arms 47 begin to rotate to place the conductors 46 into selected slots 50a, 50b of the respective rotors 20.

Figure 14:
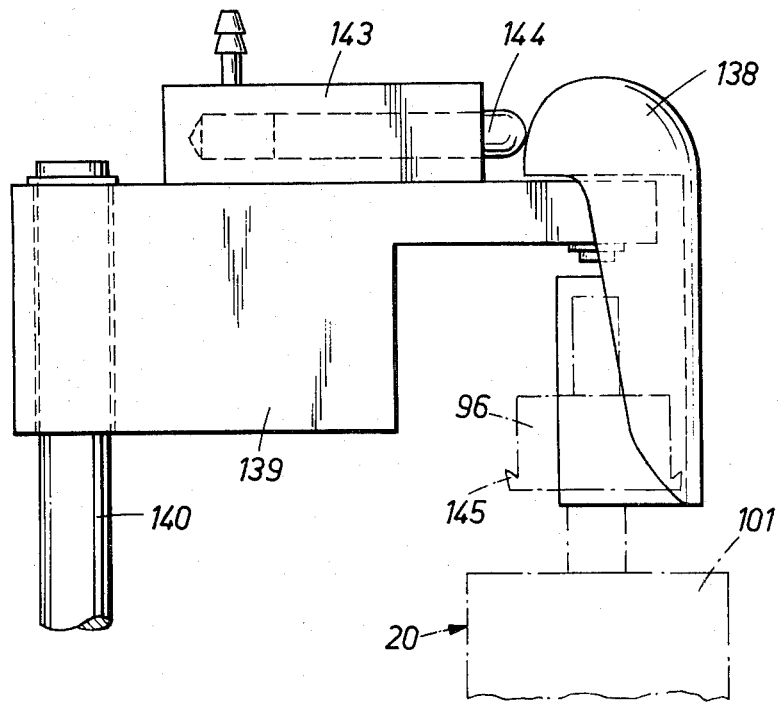
FIG. 14 is an enlarged side elevational view of a movable cap for the commutator of a rotor.
Figure 15:
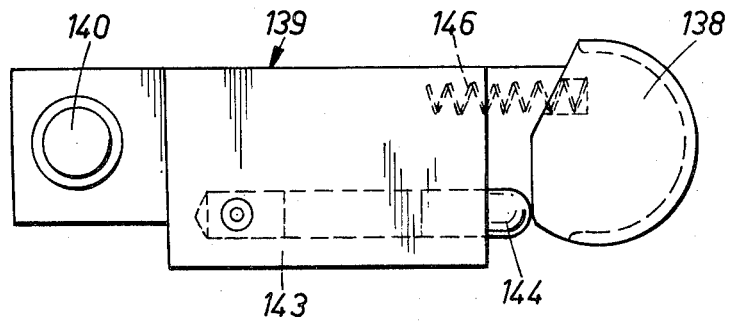
FIG. 15 is a plan view of the structure shown in FIG. 14.

The conveyor 69 further supports shielding devices or caps 138 which serve to partially overlie the commutators 96 of rotors 20 at the eight winding stations. As shown in FIGS. 14 and 15, each cap 138 is mounted on an arm 139 which is turnable within limits with a vertical shaft 140 secured to the confining plate 77 and/or 75 of the conveyor 69. Each shaft 140 carries a pinion (not specifically shown) which meshes with an elongated toothed rack 141. The latter is parallel with the rack 124 for the pinions 122 of the pivotable jaws 121 and is guided in cutouts 125', 127' (see FIGS. 5 and 8) of the brackets 72 and blocks 126. The means for reciprocating the rack 141 comprises a pneumatic cylinder 142 which serves as a means for moving the caps 138 into and from a position of overlap with the commutators 96 of the respective rotors 20. Each arm 139 supports a discrete pneumatic cylinder 143 having a plunger 144 (see FIGS. 14 and 15) which can pivot the adjacent cap 138 with reference to the corresponding arm 139. As shown in FIG. 14, the segments of the commutators 96 are provided with hook-shaped retainers 145 for the conductors 46. The cylinder 143 pivot the caps 138 prior to and upon completion of a winding operation so as to allow the winding arms 47 to place the conductors 46 over the respective retainers 145. Each cap 138 is biased by a helical spring 146 which urges it into abutment with the plunger 144 and thus insures that the cap reassumes a starting position when the plunger is retracted into the respective cylinder 143. In such starting position, the cap 138 overlies the commutator 96 at the respective winding station.

Figure 5:
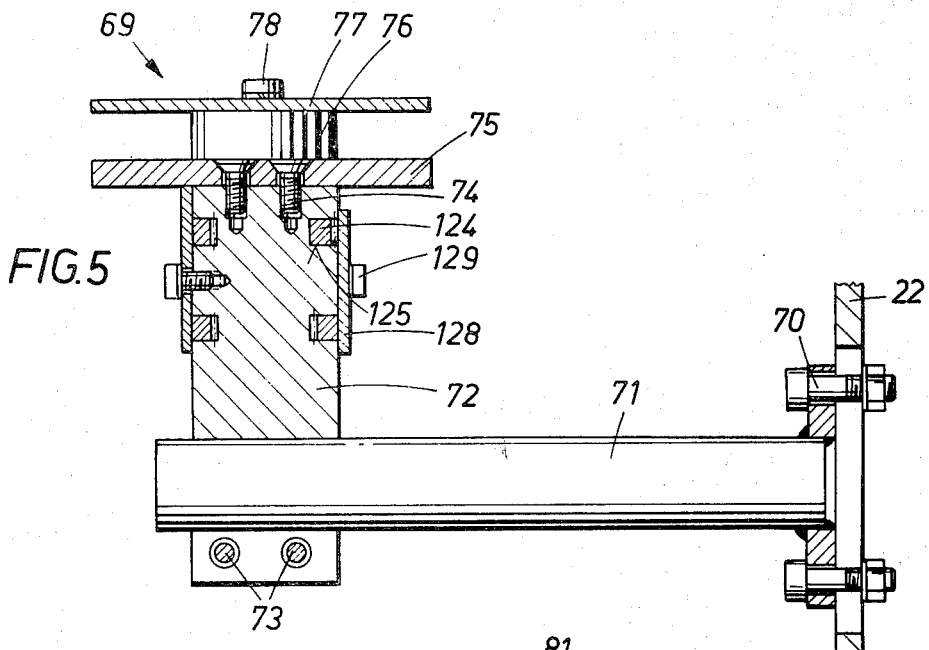
FIG. 5 is an enlarged transverse vertical sectional view of the conveyor as seen in the direction of arrows from the line V—V of FIG. 4.
Figure 6:
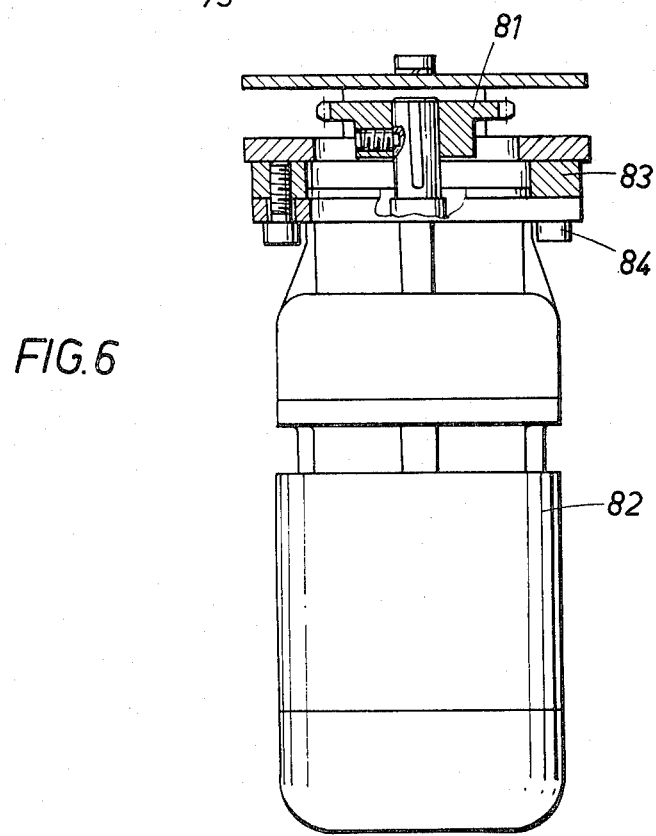
FIG. 6 is an enlarged transverse vertical sectional view as seen in the direction of arrows from the line VI—VI of FIG. 4.
Figure 7:
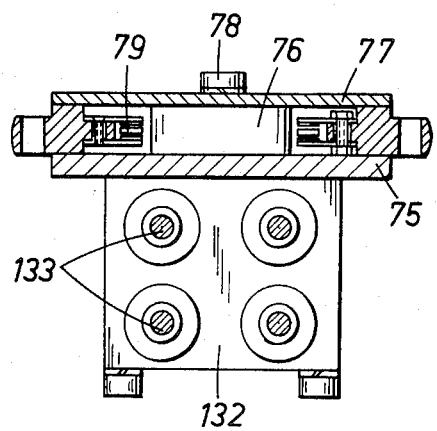
FIG. 7 is an enlarged transverse vertical sectional view as seen in the direction of arrows from the line VII—VII of FIG. 4.
Figure 8:
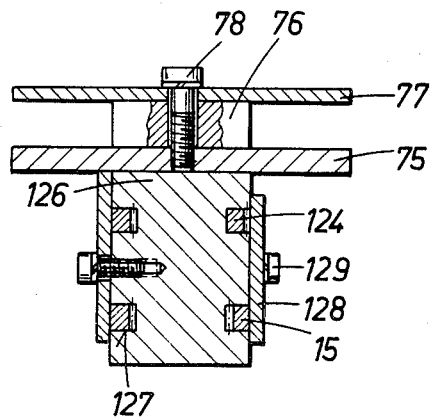
FIG. 8 is an enlarged transverse vertical sectional view as seen in the direction of arrows from the line VIII—VIII of FIG. 4.
Figure 9:
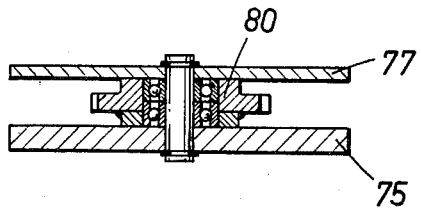
FIG. 9 is an enlarged transverse vertical sectional view as seen in the direction of arrows from the line IX—IX of FIG. 4.

The strokes of the rack 141 can be adjusted in the same way as described for the rack 124 (see FIG. 4). FIGS. 5, 7 and 8 show that the convyor 69 can support a pair of racks 141.

FIGS. 16 and 17 illustrate one of eight guide 147 for the conductors 46. Each guide 147 is pivotable with a shank 149 and serves to insure proper introduction of a conductor 46 into selected slots 50a, 50b in the laminations 101 of the rotor 20 in the course of a winding operation. The guides 147 are mounted on the conveyor 69 or on the frame 21–23.

When the chain 79 is at a standstill, eight of the twenty-four holders 93 register with the winding stations I to VII. The rotors 20 whose shafts 97 are received in the bearing sleeves 95 of these eight holders 93 are biased against the flat surfaces 102 of the respective back supports 99 by the clamping members 53 which are biased by the springs 62 as soon as the shifting bar 55 is moved to its front end position. The indexing bar 104 is thereupon caused to perform a forward stroke and a return stroke so as to make sure that each of the eight rotors 20 is held in an optimum angular position (see FIG. 13) prior to start of the first winding operation. Also, the arms 139 cause the caps 138 to overlie the respective commutators 96. However, the cylinders 143 on the arms 139 receive a pressurized fluid so as to expel the respective plungers 144 against the opposition of the corresponding springs 146 (FIGS. 14–15) so that each cap 138 exposes one of the hook-shaped retainers 145 on the respective commutator 96. This enables the respective winding arm 47 to loop the conductor 46 over the exposed retainer 145 on a segment of the commutator 96.

When the winding operation is completed, each winding arm 47 dwells in its lower end position so that the respective conductor 46 extends between the jaws 120, 121 of the respective gripping device 118 (which is then held in an open position). When a supply of conductor 46 is exhausted so that the respective source 46A must be replaced with a fresh source, the leading end of the conductor 46 which is being withdrawn from the fresh source 46A is preferably convoluted onto a screw or a like attaching means 148 (see FIG. 11) so that the leading end is fixed thereto. The arm 47 thereupon turns in a direction counter to the normal direction of rotation in order to loop the conductor 46 over a hook-shaped retainer 145. Prior to such looping of the conductor 46 over a retainer 145 (at the start of a winding operation), the respective guide 147 (FIGS. 16–17) moves from an idle position to the operative position of FIGS. 16 and 17 to thus insure that the conductor 46 will invariably enter the selected slots 50a, 50b. The inserted conductor 46 forms in the slot a loop 153 (FIG. 16) located at that end of the slot which is remote from the commutator 96 and extending between the lower ends of the respective slots 50a, 50b.

Once the conductor 46 is placed over a retainer 145 of the commutator 96, the cap 138 is allowed to return to its overlapping or shielding position under the action of the respective spring 146 and the winding arm 47 begins to turn in the normal direction to form a succession of coils. The means for causing the winding arms 47 to turn in direction counter to the normal directions includes the aforementioned control shaft 40 which may be provided with permanent magnets (not shown) and controls the operation of the prime mover 25 by way of suitable reed contacts and/or relays, not shown.

The shanks 149 off the guides 147 are mounted in the confining plates 75, 77 and carry pinions (not shown) meshing with a toothed rack 150 (FIG. 4). The latter is reciprocable in cutouts 125", 127" of the brackets 72 and blocks 126, the same as the racks 124 and 141, and is reciprocable by a pneumatic cylinder 151.

A single stage of the winding operation normally involves the making of several turns of conductor 46, such turns extending into the selected slots 50a, 50b of the respective rotor 20. Due to aforedescribed nature of the prime mover 25, it is possible to regulate the speed of the winding arms 47 during each stage. Thus, the prime mover 25 is preferably set to gradually accelerate the shafts 35 to a relatively low speed and to thereupon accelerate such shafts to a higher or normal operating speed. Shortly before the completion of a winding stage, the speed of the shafts 35 is gradually reduced so that the rate of speed at which the arms 47 form the last convolutions or turns of a winding decreases gradually. This reduces the inertia of the arms 47 so that each arm can be brought to a full stop in an accurately determined angular position. The revolutions of the winding arms 47 are counted by the control shaft 40 or by a member which receives motion from the control shaft (or from one of the belts 27, 33, 33) to allow for accurate regulation of the operating speed of the prime mover 25. Once a stage of the winding operation is completed, the indexing bar 104 turns the eight rotors 20 at the respective winding stations so as to place different pairs of slots 50a. 50b into an optimum position for reception of convoluted conductors 46 subseqent to looping of the conductors over the next retainers 145 of the associated commutators 96. The procedure is repeated as often as necessary so that the rotors 20 at the winding stations are provided with a requisite number of windings. The making of the last winding is followed by the looping of conductors 46 over the last retainers 145 of the respective commutators 96 and the winging arms 47 are arrested in their lower end positions so that the conductors 46 extend between the jaws 120, 121 of the respective gripping devices 118 which are caused to close and to grip the conductors prior to actuation of the motor 82 which removes the freshly treated rotors 20 from the winding stations and delivers thereto a set of eight fresh rotors 20. The removal of freshly treated rotors 20 from the winding stations is preceded by retraction of the shifting bar 55 so that the clamping member 53 are moved away from the adjacent rotors. Also, the guide members 147 are moved to their idle positions and the arms 139 for the caps 138 are pivoted to their retracted positions so as to allow for unimpeded transport of freshly treated rotors 20 beyond the winding stations. The next winding operation is preceded by forward movement of the shfting bar 55 so that the freshly delivered rotors 20 are properly held between the clamping members 53 and the associated back supports 99.

The various operations are preferably controlled by a suitable programming system (an example of which is shown in FIGS. 18–24) so that an attendant merely removes freshly treated rotors 20 from the holders 93 and inserts fresh rotors 20 for transport to the winding stations. However, and as mentioned above, it is possible to employ automatic rotor feeding and removing mechanisms so that the attendant is merely required to supervise the automatic operation of the apparatus and to arrest the prime mover 25 and/or the motor 82 in the event of a faulty operation.

It is clear that the improved apparatus is susceptible of many additional modifications without departing from the spirit of the invention. For example, the number of winding stations may be reduced below or increased beyond eight and/or the conveyor 69 can employ a chain another endless flexible element with fewer or more than twenty-four holders 93 (or analogous holders) for rotors 20. If the number of holders 93 is increased to 32, 40, 48 or more (provided that the apparatus comprises eight winding stations), the attendant has more time to remove freshly treated rotors 20 and/or to insert untreated rotors. Still further, the chain 79 or an analogous endless flexible element can be trained over three or more sprocket wheels so that the stretch where the freshly finished rotors 20 are removed from the holders 93 need not be parallele to that stretch which extends along the row of winding stations I to VIII. However, the arrangement shown in FIG. 1 is preferred at this time because the conveyor 69 occupies little room. Also, one full stretch of the chain 79 is accessible for insertion of fresh rotors 20 into empty holders 93 and for removal of wound rotors subsequent to treatment at the winding stations. All an attendant has to do is to insure that the eight holders 93 which are located immediately upstream of the first winding station I will be loaded with fresh rotors 20 before the chain 79 is caused to advance by a step so as to move a set of eight fresh rotors 20 into register with the clamping members 53 at the stations I to VIII. It will be noted that the conveyor 69 serves as a magazine for at least one set of fresh rotors 20, as a means for transporting successive sets of rotors to the winding stations, as a means for removing wound rotors from such stations, and as a means for temporary storage of wound rotors downstream of the station VIII.

An important advantage of the conveyor 69 is that it enables an attendant to insert into the holders 93 several sets of fresh rotors 20 while a set of rotors is being treated at the winding stations I to VIII. It was found that a single attendant can service several winding apparatus of the type shown in FIGS. 1–17 because the removal of wound rotors and the insertion of a corresponding number of fresh rotors 20 into the holders 93 can be completed within a very short interval of time which is normally much shorter than the interval required for treatment of a set of rotors at the winding stations. Of course, an attendant can supervise an even larger number of discrete apparatus if the loading and-/or unloading of rotors is performed by automatic or semiautomatic means. For example, a magazine for a substantial supply of fresh rotors 20 can be provided with eight chutes each of which delivers a rotor 20 to a freshly evacuated holder 93 along the upper stretch of the chain 79, as viewed in FIG. 1. If the number of holders 93 is a large multiple of the number of winding stations (e.g., if the number of holders is six times the number of winding stations), the conveyor can be moved by several steps before it becomes necessary to remove two, three or even more sets of wound rotors and to load fresh rotors into the thus evacuated holders.

FIGS. 18–24 depict an exemplary control circuit for controlling the arrangement described above.

The illustrated control circuit is supplied with 380 volt three-phase power. Furthermore, a 24-volt control current is employed. As can be seen from FIG. 18, associated with the three phases R, S and T of the three-phase current are three control lamps $h1$, $h2$ and $h3$.

Figure 18:
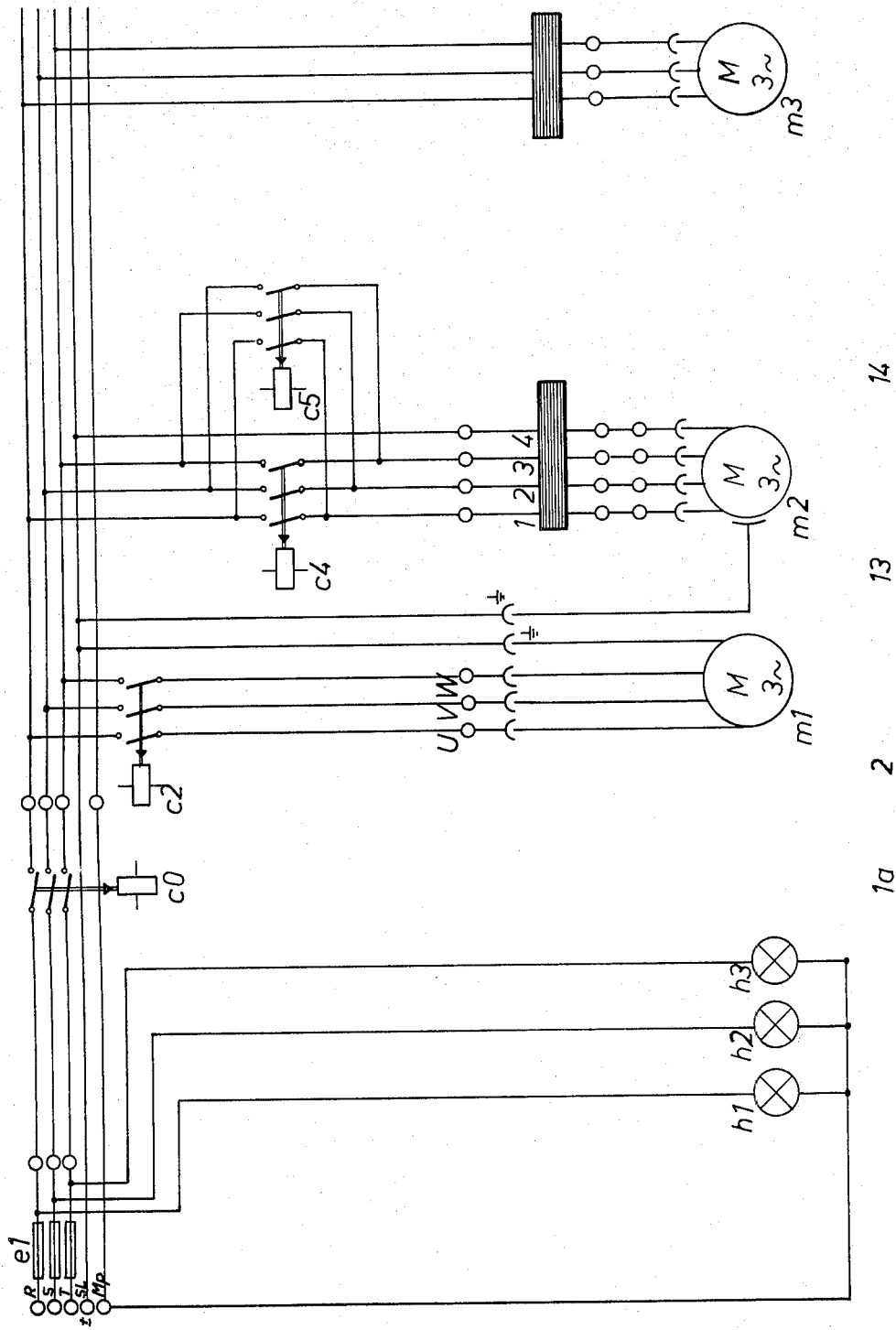

As can be seen in FIG. 18, a motor $m1$ is provided. This constitutes the motor 82 for the conveyor 69. A further drive motor $m2$ is provided, this constituting the motor 25, in the form of three-phase control and braking motor of the disk-armature short-circuited-rotor type, provided with braking action so that when disconnected from power it does not coast to a stop. The motor $m2$ is provided with a ventilator $m3$. Ventilator $m3$ ensures that the motor is sufficiently cooled, even at low motor speeds and during braking. The motor in question may be a commercially available motor of the type produced by the AREG company of Besigheim/Wuerttemberg, Western Germany.

To turn on the arrangement, the momentary switch $b2$ (see FIG. 19) is closed. To turn off the arrangement, the momentary switch $b1$ is closed. The two momentary switches $b1$ and $b2$ are shown located in column 1 of FIG. 19. A reference numeral is provided under each vertically extending conductor, and the circuitry connected in the path of such conductor is referred to as belonging to a particular column of the circuit, to facilitate explanation. Activation of momentary switches $b1$ and $b2$ in column O causes energization of relay coil $cO$, located in the same column. Underneath the reference numeral designating the column, there is provided a cross-shaped pair of lines for tabulation. The left heading marked $o$ indicated openings, and the right heading, marked $s$ indicated closings. For example, in FIG. 19, in column 18, there is provided a relay coil designated $d19a$. This relay coil $d19a$ controls the position of six different switches, all designated $d19a$ and respectively located in columns $10a$, 16, 18, $18a$, $64a$ and 88. When relay coil $d19a$ in column 18 becomes energized, the corresponding relay switches designated $d19a$ in columns 16, $64a$ and 68 open, and the corresponding relay switches designated $d19a$ in columns $18a$, $10a$ and 18 close, as can be seen from the table at the bottom of column 18. Conversely, when the energized relay coil $d19a$ in column 18 becomes deenergized, the corresponding relay switches $d19a$ in columns 16, $64a$ and 68 close, while the corresponding relay switches $d19a$ in columns $18a$, $10a$ and 18 open. The meaning of the tabulation at the bottom of column O is as follows: When the relay coil $cO$ is energized, the corresponding relay switch $cO$ in column 1 closes. Furthermore, the three associated switches in column $1a$ (see FIG. 18) close. If the momentary switch $b2$ is briefly closed, the relay switch $cO$ establishes a self-locking of current flow in column 1, even after the momentary switch $b2$ is released and reopens. Furthermore, in column $1a$ (FIG. 18) the 380-volt three-phase power remains applied. To turn off the arrangement, the momentary switch $b1$ is briefly opened, interrupting the current flow of the relay coil $cO$, so as to terminate current flow in column O.

Figure 19:
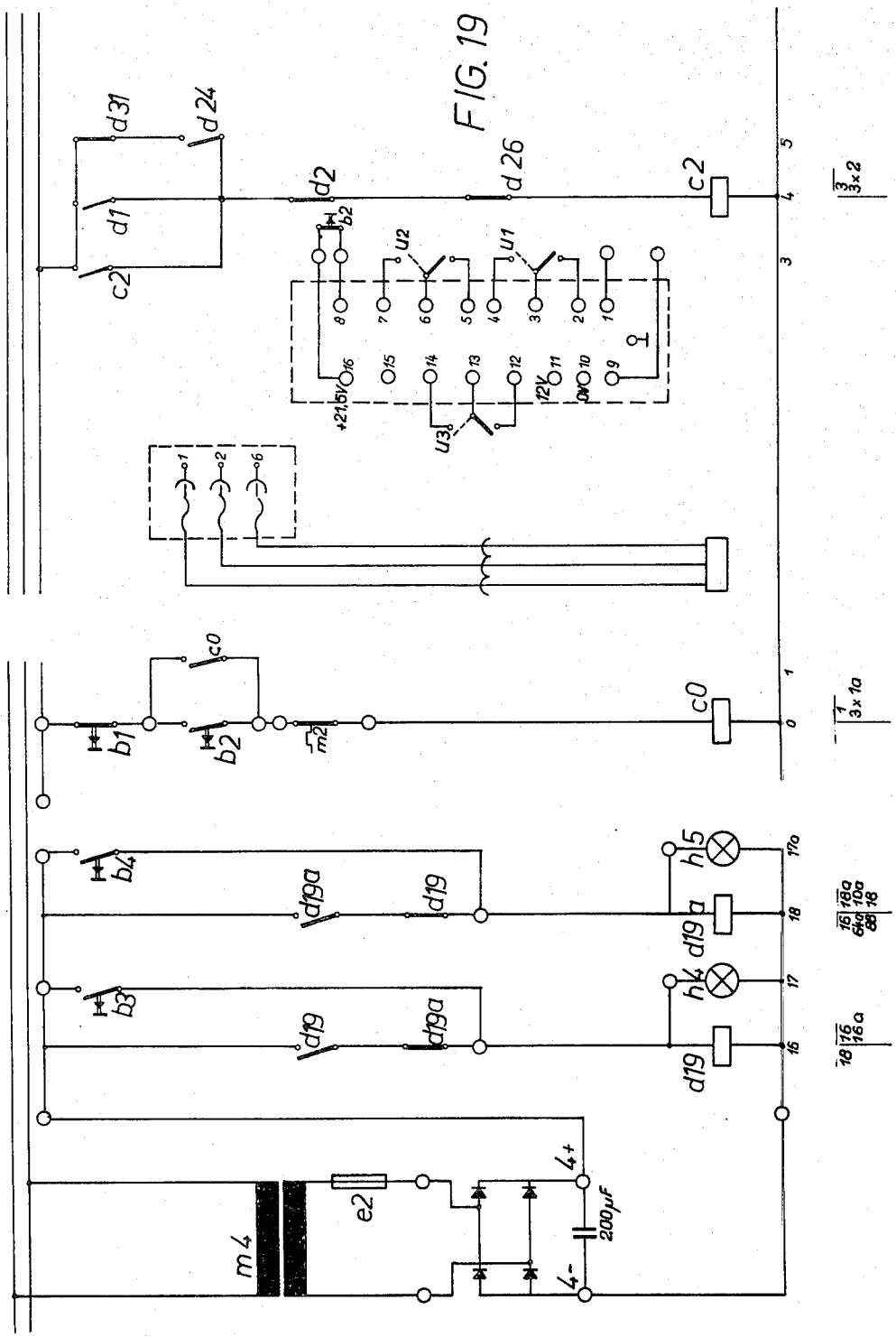

After the momentary switch $b2$ has been briefly closed, one of the momentary switches $b3$ and $b4$ is briefly closed. Switch $b3$ is shown in FIG. 19 located in column 17, whereas switch $b4$ is located in column $17a$. The momentary switch $b4$ is to be closed when the machine is to be readied for operation. To this end, the individual operating steps can be separately activated. Activation of momentary switch $b4$ causes energization of relay coil $d19a$ and simultaneous turning on of control lamp $h5$. In FIG. 19, below the relay coil $d19a$, there is again presented a tabulation of the columns in which openings and closings of associated relay switches occur. When relay coil $d19a$ is energized, relay switch $d19a$ in column 16 opens. In this way, the control current does not continue to flow if the momentary switch $b3$ is subsequently closed. Furthermore, in the columns $64a$ (FIG. 22) and 88 (FIG. 24)

the relay switches $d19a$ open, preventing current flow through conductors provided for the activation of the cap 138. Additionaly, the relay switches $d19a$ in columns 18$a$ (FIG. 20), 10$a$ (FIG. 20) and 18 (FIG. 19) close. By closing relay switch $d19a$ in column 18$a$, the control current II is applied, so that the relay coils $dx$ in columns 97 and 98 (FIG. 24) will be energized, as a result of which the corresponding relay switches in the current paths in columns 10$a$, 85, 87, 89, 91, 93 and 95 will close. As a result, if now any of the momentary switches $b10$, $b11$, $b12$, $b13$, $b14$ and $b15$ shown in FIG. 24 are briefly closed, the respective one of the magnet valves $s1$, $s2$, $s3$, $s4$, $s5$ and $s6$ will be activated. The magnet valves 5 control a stream of compressed air originating from a source of compressed air and control associated pneumatic cylinders. Magnet valve $s1$ controls the pneumatic cylinder 58, which causes the clamping members 53 to be brought into engagement with the rotors. The magnet valve $s2$ controls the pneumatic cylinder 143 (FIGS. 14 and 15), by means of which the cap 138 is activated. The magnet valve $s3$, likewise depicted in FIG. 24, controls the pneumatic cylinder 142 which in turn controls the swinging movements of arm 139 (see FIGS. 14, 15). The magnet valve $s4$ controls the pneumatic cylinder 114, which in turn controls the indexing bar 104, so that the clampled rotors can be properly lined up.

The magnet valve $s5$ actuates the conductor guides 147 shown in FIGS. 16 and 17. The pneumatic cylinders for these conductor guides are not further illustrated since, as is especially clear from FIG. 4, four pneumatic cylinders are arranged underneath the conveyor 69, of which only the two front ones 131 and 151 are visible. From FIGS. 5 and 8 it will be seen that four racks 124, 150 and 141 are provided. The arrangement is provided with two further racks, one of which serves to control the conductor guides 147.

The magnet valve $s6$ serves to actuate the pneumatic cylinder 131 which controls the gripping device 118.

The momentary switches $b10$ to $b15$ in columns 85, 87, 89, 91, 93 and 95 of FIG. 42 can be briefly closed to actuate the magnet valves $s1$ to $s5$ to initiate and precisely adjust the pneumatically empowered operating units. For example, the threaded pin 133 can be adjusted relative to the lock nut 134.

When setting up the arrangement, the motor $m2$ (25) can be turned on. This is accomplished by briefly closing the momentary switch $b9$ in column 10$a$ of FIG. 20. Closing of switch $b9$ energizes relay coil $c5$ in column 8$a$ of FIG. 20. The energized relay coil $c5$ opens the associated relay switch $c5$ in column 7$a$ and closes the three associated relay switches in column 14. The opening of switch $c5$ in column 7$a$ prevents energization of relay coil $c4$, as a result of which a reversal of motor direction cannot be effected. Closing of the three ganged relay switches in column 14 turns the motor on. The motor $m2$ runs in the forwards direction, at low speed since as shown in the left-hand columns 21$a$, 21$b$ of FIG. 20 the potentiometer P2 is connected in circuit.

To turn off the arrangement, and to switch over into automatic operation, the momentary switch $b1$ in column O is briefly opened. To initiate automatic operation, first the momentary switch $b2$ and then the momentary switch $b3$ are briefly closed.

As already mentioned, the momentary switch $b4$ in FIG. 19 is closed only to set up or prepare the arrangement. For automatic performance of the various operations of the arrangement, the momentay switch $b3$ in column 17 of FIG. 19 is closed. This energizes the relay coil $d19$ in column 16. Furthermore, the control lamp $h4$ in column 17 of FIG. 19 lights up. In the drawing, below relay coil $d19$ there is again tabulated the columns in which associated relay switches are opened and closed. In column 18 the current path is interrupted; that is, a subsequent closing of the momentary switch $b4$ does not result in a self-locking action. In column 16 the current path is complete, so that a self-locking action does occur. Furthermore, in column 16$a$ of FIG. 20 the current path is complete, so that the control current I is applied.

Figure 20:
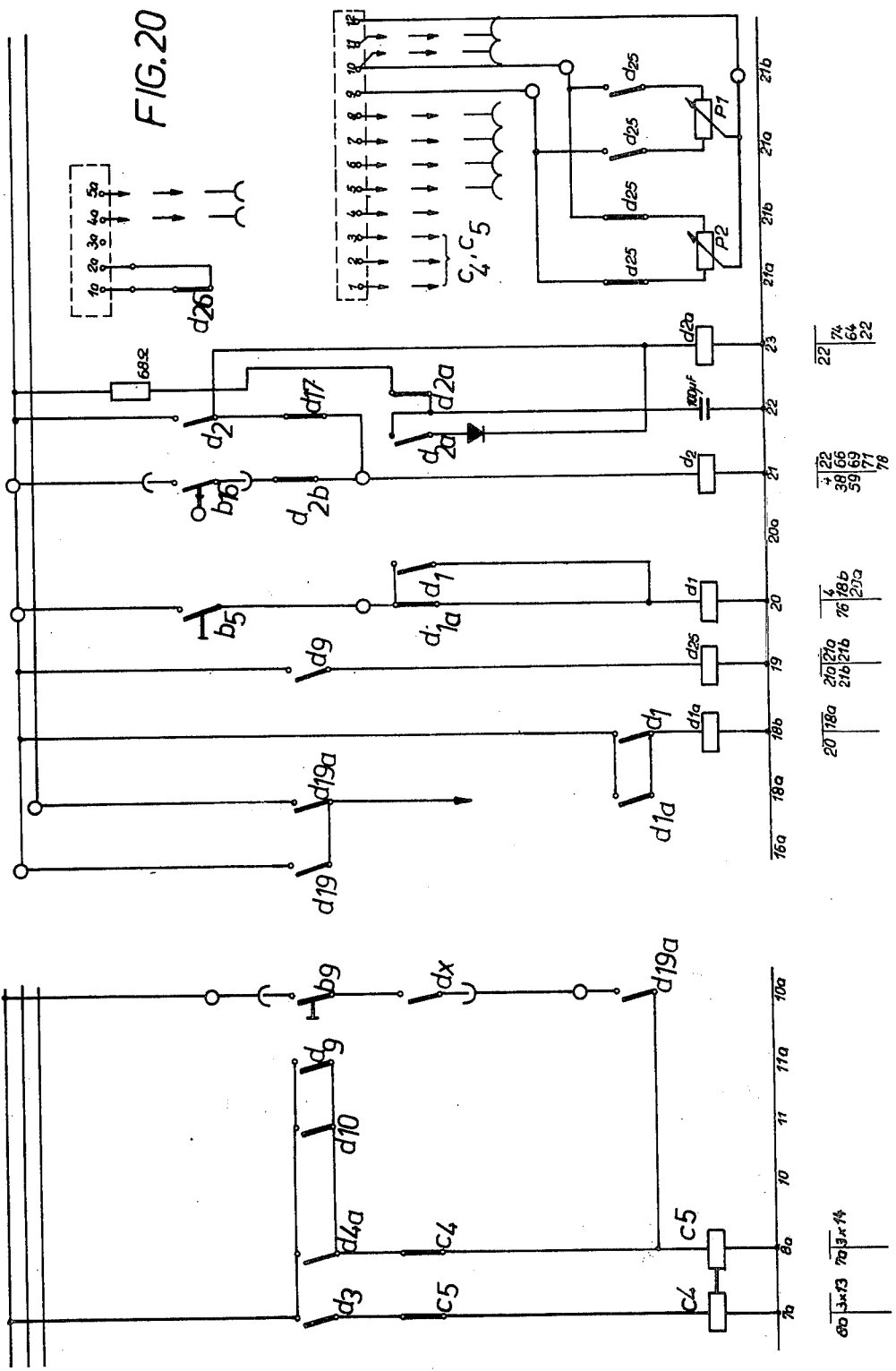

To start the operation of the arrangement, the momentary switch $b5$ in column 20 of FIG. 20 is closed. This energizes relay coil $d1$. The relay switch $d1$ in column 76 opens, so that closing of momentary switch $b8$ in column 77 produces no self-locking of the relay $d31$. Furthermore, the energized relay coil $d1$ closes associated relay switches $d1$ in columns 4, 18$b$ and 20$a$. Closing of switch $d1$ in column 18$b$ of FIG. 20 energizes relay coil $d1a$. Relay coil $d1a$ then opens relay switch $d1a$ in column 20, and closes relay switch $d1a$ in column 18. Opening of relay switch $d1a$ in column 20 has the result that the relay coil $d1$ cannot again be energized by closing momentary switch $b5$ during operation of the machine. Closing of relay switch $d1a$ in column 18$a$ establishes a self-locking action. As already mentioned, energization of relay coil $d1$ in column 20 closes relay switch $d1$ in column 4. This results in energization of relay coil $c2$, in turn closing relay switch $c2$ in column 3 and closing the three relay switches in column 2; relay coil $c2$ is depicted in both columns 2 and 4. This results in connection to the power circuit of the motor $m1$ (82) for the conveyor 69. Motor $m1$ (82) operates until one of the trips 180 of the chain 79 activates the switch 181. In the drawing, the switch 181 shown in FIG. 1 corresponds to the switch $b16$ in column 21 of FIG. 20. Activation of switch $b16$ results in activation of relay $d2$ in column 21 and of relay $d2a$ in column 23. The relay coil $d2$ opens the corresponding relay switches $d2$ in columns 4, 38 and 59 and closes the switches $d2$ in columns 22, 66, 69, 71 and 78. The relay coil $d2a$ opens corresponding relay switch $d2a$ in column 22 and closes relay switches $d2a$ in columns 74, 64 and 22. Opening of relay switch $d2$ in column 4 deenergizes relay coil $c2$ in column 4 ($c2$ also shown in column 2), thereby disconnecting the motor $m1$ of the conveyor arrangement from power. Closing of the conductor in column 22 establishes a self-locking action with respect to relay coils $d2$ and $d2a$. The closing of relay switch $d2$ in column 78 energizes relay coil $d2b$. As a result, relay switch $d2b$ in column 21 opens, so that tripping of switch $b16$ can no longer effect energization of relay coil $d2$. The closing of relay switch $d2b$ in column 78 (FIG. 23) establishes a self-locking action wiith respect to the relay coil $d2b$. Furthermore, energization of relay coil $d2a$ in column 23 closes relay switch $d2a$ in columne 64, energizing relay coil $d27a$. Energized relay coil $d27a$ closes relay switch $d27a$ in column 79, so as to energize the time-delay relay coil $d27$. After a preselected time delay, the relay coil $d27$ closes the relay switch $d27$ in column 65.

Figure 23:
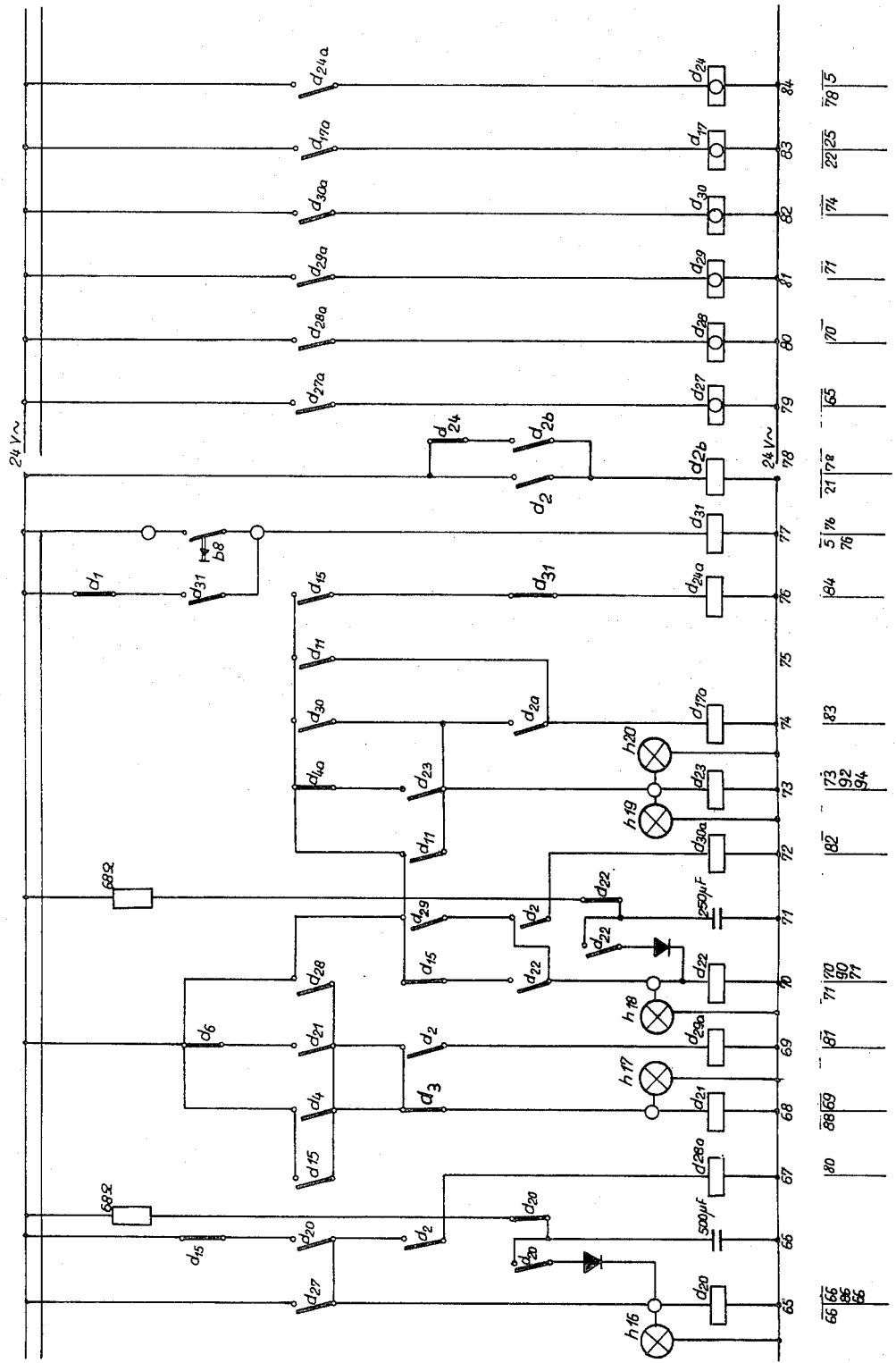

The energized time-delay relay coil $d27$ in column 79 of FIG. 23 furthermore closes relay switch $d27$ in column 65, so that the control lamp $h16$ will light up and the relay coil $d20$ will become energized. Furthermore, since in column 66 the relay switch $d2$ is already closed, the relay coil $d28a$ in column 67 will also become energized. The relay coil $d20$ in column 65 opens the relay switch $d20$ in column 66, and closes the relay switches $d20$ in columns 66, 86 and 66. The relay coil $d28a$ in column 67 closes the relay switch $d28a$ in column 80. The closing of relay switch $d20$ in column 86 actuates the magnet valve $s1$ in column 85. As a result, as already mentioned, the pneumatic cylinder 58 is loaded, so that the clamping members 53 engage the rotors 20.

The closing of switch $d28a$ in column 80 energizes relay coil $d28$. After a preselected time interval, the relay coil $d28$ closes the relay switch $d28$ in column 70. This results in energization of relay coil $d21$ in column 68 and, since in column 69 the switch $d2$ is already closed, furthermore results in energization of relay coil $d29a$. The relay coil $d21$ column 68 opens the relay switch $d21$ in column 69. The aforementioned energization of relay coil $d21$ in column 68 opens relay switch $d21$ in column 88 and thereby deenergizes the magnet valve $s2$, so that the cap 138 moves to its open position. The relay coil $d29a$ in column 69 closes the relay switch $d29a$ in column 81. This reslutes in energization of the time-delay relay $d29$ in column 81. The time-delay relay $d29$ in column 81 after a preselected time interval closes the relay switch $d29$ in column 71. This results in energization of relay coil $d22$ in column 70 and, since relay switch $d2$ in column 71 is already closed, also results in energization of relay coil $d30a$ in column 72. Relay coil $d22$ in column 70 opens relay switch $d22$ in column 71 and closes the relay switches $d22$ in columns 70, 90 and 71. The relay coil $d30a$ closes the relay switch $d30a$ in column 82. As a result of the closing of switch $d22$ in column 90, the magnet valve $s3$ is activated, and accordingly the pneumatic cylinder 142 moves the arm 139 (FIGS. 14, 15) to the operative position. This is possible since the cap 138 assumes its open position.

Closing of switch $d30a$ in column 82 effects energization of time-delay relay coil $d30$. After elapse of a preselected time interval, the relay coil $d30$ closes the relay switch $d30$ in column 74. This results in energization of relay coil $d17a$ in column 74. Relay coil $d17a$ closes relay switch $d17a$ in column 83. As a result, the time-delay relay coil $d17$ becomes energizes. After elapse of a preselected time interval, relay coil $d17$ opens the relay switch $d17$ of column 22, and closes the relay switch $d17$ of column 25. Opening of switch $d17$ in column 22 results in deenergization of relay coil $d2$ in column 21. This results in opening of the corresponding relay switches $d2$ in columns 4, 38 and 59, and closing of the corresponding relay switches $d2$ in columns 22, 66, 69, 71 and 78. As a result, the relay coil $d2a$ in column 23 is deenergized.

Closing of the current path in column 74 results in energization of relay coil $d23$ in column 73. Relay coil $d23$ closes the corresponding relay switches $d23$ in columns 73, 92 and 94. Closing of the switches $d23$ in columns 92 and 94 actuates the magnet valves $s4$ and $S5$ and therefore the pneumatic cylinder 114 for the proper orienting of the rotors by the bar 104, and also actuates the pneumatic cylinder for the conductor guide 147.

Establishing of current flow in the current flow in the current path of column 25 results in energization of the relay coil $d3$ in column 24 and simultaneous lighting up of the control lamp $h6$. Energization of relay coil $d3$ opens the relay switches $d3$ in columns 58, 28 and 68 and closes the relay switches $d3$ in the columns $7a$, 24 and 26. Opening of relay switch $d3$ in column 68 terminates current flow through relay coil $d21$, and accordingly the relay switch $d21$ in column 88 again closes actuating magnet valve $s2$. The cap 138 thereupon reassumes its operative position. The closing of relay switch $d3$ in column $7a$ energizes the relay coil $c4$, as a result of which relay switch $c4$ in column $8a$ opens and the three ganged relay switches in column 13 close.

The opening of the normally closed relay switch $c4$ in column $8a$ renders the normally open relay switches $d4a$ in column $8a$, $d10$ in column 11, and $d9$ in column $11a$ incapable of effecting energization of relay coil $c5$. When the three ganged relay switches in column 13 controlled by relay coil $c4$ are closed, the motor $m2$ (25) is turned on. The motor runs backwards, and at low speed, since the potentiometer $P2$ in the lefthand columns $21a$, $21b$ of FIG. 20 is connected in circuit.

As the motor $m2$ (25) runs backwards, the winding arm 47 turns from the downwardly facing normal position through an angle of about 270°. As already explained in the description of the mechanical part of the exemplary arrangement, there are provided on the control shaft 40 magnets cooperating with reed contacts. When the control shaft turns, a magnet comes into operative proximity to a reed contact, to activate the latter. Such a reed contact is shown in column 26 of FIG. 20 and designated $bml$. Activation of the reed contact $bml$ in column 26 results in activation of the relay coil $d4$ in column 27. An electronic circuit stage EZ 10/1 is provided in the current path of column 27. Energization of relay coil $d4$ in column 27 effects opening of relay switch $d4$ in column 29 and closing of relay switches $d4$ in columns 30, 32, 62 and 68. Closing of switch $d4$ in column 32 results in energization of relay coil $d4a$ in column 31. The energized relay coil $d4a$ opens relay switches $d4a$ in columns 73, 24, 35 and 42 and closes relay switches $d4a$ in columns $8a$, 31, 33 and 40. Opening of switch $d4a$ in column 24 results in deenergization of relay coil $d3$. This results in reopening of relay switch $d3$ in column $7a$, so that the relay coil $c4$ becomes deenergized, and accordingly the motor $m2$ (25) comes to a halt. Also, relay switch $c4$ in column $8a$ closes again to effect energization of relay coil $c5$, so that the motor $m2$ (25) again commences to turn at low speed but in the forwards direction. As a result of interruption of the current path of column 73, the relay coil $d23$ again becomes deenergized, so that the realy switches $d23$ in columns 73, 92 and 94 again open. The opening of relay switches $d23$ in columns 92 and 94 results in reactuation of the magnet valves $s4$ and $s5$, so that the pneumatic cylinder 114 moves the indexing bar 114 back to the normal position, while the pneumatic cylinder for the conductor guide arrangement 147 moves the latter back to the normal position. Closing of the reed contact $bml$ in column 26 results in energization of relay coil $d4$ and closes normally open switch $d4$ in column 28, thereby energizing relay coil $d21$. As a result, compressed air is applied to the pneumatic cylinder 143 associated with the cap 138, and the cap 138 opens. The winding arms 47 perform a slow forwards movement and as a result the conductors guided by the winding arms 47 are laid into respective ones of the collector hooks.

The slow forward running of the motor $m2$ continues until the winding arms 47 again face downwards. In this position of the winding arms, a further magnet mounted on the control shaft 40 comes into operative proximity to a reed contact. This just-mentioned reed contact is shown in column 33 of FIG. 21 and designated $bm2$. When read contact $bm2$ is closed, the relay coil $d6$ in column 34 becomes energized. An electronic stage EZ 10/2 is connected in the current path of the relay coil $d6$.

The energized relay coil $d6$ opens the relay switches $d6$ in columns 36 and 69 and closes the relay switch $d6$ in column 37. Opening of switch $d6$ in column 69 results in deenergization of relay coil $d21$, so that the magnet valve $s2$ for the cap is again actuated. The cap 138 once more assumes its operative position, and covers the collector, so that the conductor can no longer be caught in the collector hook.

Figure 21:
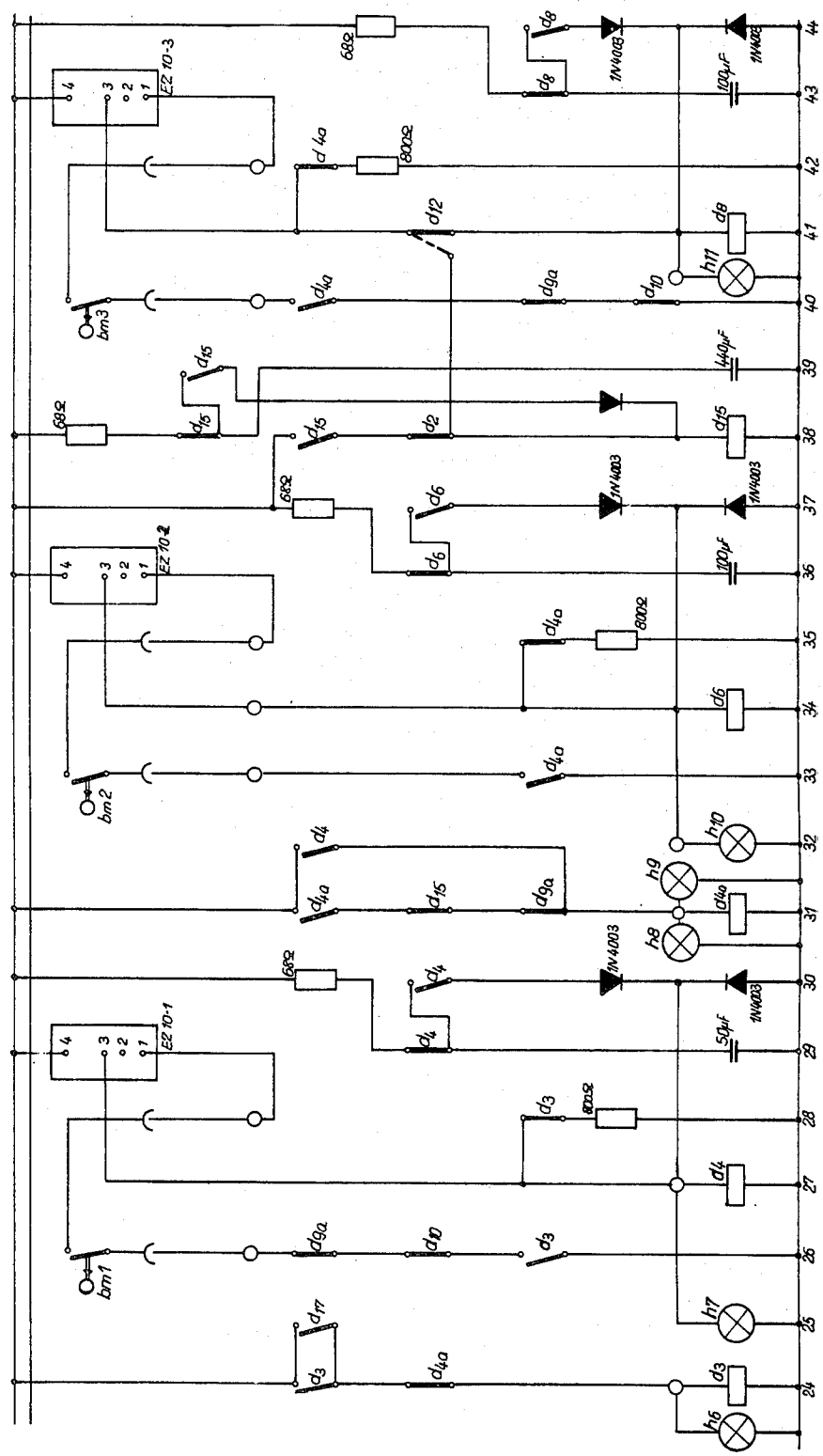

Closing of reed contact $bm2$ in column 33 of FIG. 21 does not result in turning off of motor $m2$. The motor $m2$ continuous to run forward at low speed. This forward movement continues until a further magnet on control shaft 40 comes into operative proximity with a further reed contact. This lastmentioned reed contact is designated in the circuit diagram $bm3$ and shown in column 40 of FIG. 21. Closing of reed contact $bm3$ results in energization of relay coil $d8$ in column 41. The energized relay coil $d8$ in column 41 opens the relay switch $d8$ in column 43 and closes the relay switches $d8$ in columns 44 and 46. Closing of relay switch $d8$ in column 46 results in energization of relay coil $d9$ in column 45. The energized relay coil $d9$ in column 45 closes corresponding relay switches $d9$ in columns 11a, 45, 47 and 19. Closing of relay switch $d9$ in column 11a results in energization of relay coil $c5$, even when the normally open switch $d4a$ in column 8a is again opened. As a result of the closing of the normally open switch $d9$ of column 45, the flow of energizing current through relay coil $d9$ can be interrupted under the control of the counter-controlled switch $u2$. Closing of the current path of column 47 results in energization of relay coil $d9a$ in column 47. Closing of the current path in column 19 results in energization of relay coil $d25$.

Energization of relay coil $d9a$ results in opening of corresponding relay switches $d9a$ in columns 26, 31, 40 and 48 and in closing of the switch $d9a$ in column 48. Interruption of the current path of column 26 has the result that upon the next rotation of the control shaft 40 the reed contact $bml$ cannot effect energization of relay coil $d4$, since the current path is broken. Interruption of the current path of column 31 results in deenergization of relay coil $d4a$; among the results of this is renewed interruption of the current paths of columns 33 and 40, so that upon further rotation of the control shaft 40 no control pulses can be triggered by the reed contacts $bm2$ and $bm3$.

Closing of the current path of column 19 results in energization of relay coil $d25$. As a result, the corresponding relay switches $d25$ in the left-hand columns 21a and 21b open, and the switches $d25$ in the right-hand columns 21a and 21b close. As a result, potentiometer P1 becomes connected into the circuit and potentiometer P2 is disconnected from the circuit, so that the motor $m2$ now runs at high speed. With the motor $m2$ (25) now turning at high speed, the conductors are wound by the winding arms into the rotor slots.

Provided on the control shaft 40 is a contactless counter shown in FIG. 19 as a count indicator. With this counter the rotations of the control shaft 40 and thereby also the rotations of the winding arms 47 are counted and applied to a counting mechanism. The desired number of rotations can be set on this counting mechanism. The counting mechanism is provided with two counting arrangements. The one counting arrangement is set to the desired winding number, while the second counting arrangement is set to a somewhat smaller number. For example, if 150 windings are desired, then the first counting arrangement will be set to the number 150 and the second counting arrangement set to about 145. After 145 rotations have been performed, the counting arrangement activates the switches $u2$ located in columns 45 and 48. In column 45 the current path is interrupted, thereby deenergizing the relay coil $d9$ in column 45, the relay coil $d9a$ in column 47 and the relay coil $d25$ in column 19. Deenergization of relay coil $d25$ in column 19 results in opening of the corresponding relay switches $d25$ in the right-hand columns 21a. 21b of FIG. 20, and in closing of the corresponding relay switches $d25$ in the left-hand columns 21a, 21b of FIG. 20, so that the potentiometer P2 is again connected into the circuit, so that the motor $m2$ (25) again runs at low speed.

In column 48 switch $u2$ closes, so that the relay coil $d10$ of column 49 becomes energized. The energized relay coil $d10$ opens the corresponding relay switches $d10$ in columns 26 and 40, and closes the corresponding relay switches $d10$ in columns 11 and 49. Closing of switch $d10$ in column 49 results in a self-locking action of the relay $d10$. The motor $m1$ (25) continues to turn, at low speed, so that the winding arms 47 lay into position the final turns of the rotor windings.

After 150 rotations have been performed, the counting arrangement closes switch $u1$ in column 51, as a result of which relay coil $d10a$ becomes energized. The energized relay coil $d10a$ opens the corresponding relay switches $d10a$ in columns 49 and 56, and closes the relay switches $d10a$ in columns 52 and 53. Closing of switch $d10a$ in column 53 readies reed contact $bm4$ for actuation. Upon further low speed forward movement of motor $m2$ (25), a magnet on control shaft 40 comes into operative proximity to the reed contact $bm4$, activating the latter. Activation of reed contact $bm4$ in column 53 of FIG. 22 results in energization of relay coil $d11$ in column 52. The energized relay coil $d11$ opens the corresponding relay switches $d11$ in columns 49, 50 and 52, and closes the corresponding relay switches $d11$ in columns 58, 72 and 75.

Opening of switch $d11$ in column 50 results in deenergization of relay coil $d10$. As a result, normally closed switch $d10$ in column 26 closes, so that the reed contact $bm1$ is again readied for activation. As a further result of the deenergization of relay coil $d10$, the relay switch $d10$ in column 11 opens, to deenergize the relay coil $c5$, so that the motor $m2$ (25) receives no current and comes to a halt. Deenergization of relay coil $d10$ further results in closing of corresponding relay switch $d10$ in column 40, so that also the reed contact $bm3$ is again readied for activation.

The abovementioned opening of relay switch $d11$ in column 52 results in deenergization of relay coil $d10a$. On the other hand, the abovementioned closing of relay switch $d11$ in column 58 results in a self-locking of the relay $d11$. Energization of relay coil $d11$ in column 54 closes the relay switches $d11$ in columns 72 and 75. As a result, the relay coil $d23$ in column 73 and the relay coil $d17a$ in column 74 are energized. The energized relay coil $d23$ closes the relay switches $d23$ in columns 73, 92 and 94. Closing of switched $d23$ in columns 92 and 94 results in actuation of magnet valves $s4$ and $s5$, so that, on the one hand, the pneumatic 114 of the indexing bar 104 is actuated to index or turn the rotor by an angle corresponding to one rotor slot and so that, on the other hand, the pneumatic cylinder for the conductor guide members 147 is actuated.

The energized relay coil $d17a$ in column 74 closes the corresponding relay switch $d17a$ in column 83. As a result, the time-delay relay coil $d17$ is energized. The time-delay relay coil $d17$ in column 83 of FIG. 23 opens the corresponding relay switch $d17$ in column 22 and closes the corresponding relay switch $d17$ in column 25. Closing of switch $d17$ in column 25 results in energization of relay coil $d3$ in column 24. The energized relay coil $d3$ closes, inter alia, the corresponding relay switch $d3$ in column $7a$, so that the relay coil $c4$ becomes energized. As already explained, relay $c4$ effects a low speed backwards running of the motor 25 ($m2$). As already explained, a backwards rotation of about 270° is performed, whereupon the reed contact $bm1$ is activated. As a result, the backwards running of the motor stops, and forwards running commences. As already explained, during such forwards running the cap 138 swings to the side, so that the conductor can be hanged on one of the collector hooks. Thereafter, the cap 138 swings back to its covering position, and the conductor guide arrangement 147 returns to its disengaged position, and the low speed forward turning of motor 25 ($m2$) is converted into a high speed forward turning, until again after 145 rotations the high speed forwards turning is converted into a low speed forwards turning.

This winding operation is repeated until the count set on a third counting arrangement is reached. In the illustrated arrangement, the rotors are each provided with twelve rotor slots, and twelve windings are to be provided on each rotor. At the end of the twelfth winding operation, a pulse is produced by the third counting arrangement via the switch $u3$. The switch of relay $u3$ is shown in column 60 of FIG. 22. Activation of switch $u3$ in column 60 results in energization of relay coil $d12$ in column 59. The energized relay coil $d12$ opens the corresponding relay switch $d12$ in column 41, and closes relay switches $d12$ in columns 41, 59 and 62. Closing of switch $d12$ in column 59 results in self-locking of relay $d12$. Closing of switch $d12$ in columnn 62 readies the relay coil $d13$ in column 61 for energization when normally open switch $d4$ closes. However, relay coil $d4$ in column 27 is energized by means of the reed contact $bm1$ in column 26. After completion of the last winding, the forwards movement of motor 25 ($m2$) will, as already mention, terminate, and a low speed backwards movement will commence. This low speed backwards movement lasts for a rotation through 270°, whereupon the reed contact $bm1$ is activated. As a result, relay coil $d4$ becomes energized and, as already mentioned, the backwards running of the motor changes into forwards running. Simultaneously, the cap 138 moves to the uncovering position, so that the conductor can be hanged on one of the collector hooks. After completion of the last winding and the switching on of switch $u3$, the reed contact $bm1$ also energizes the relay coil $d13$ in column 61. The relay coil $d13$ opens the relay switch $d13$ in column 60, and closes the relay switches $d13$ in columns 61, 96 and 60. Closing of switch $d13$ in column 61 results in a self-locking action. Closing of switch $d13$ in column 96 results in actuation of magnet valve $s6$. The magnet valve $s6$ actuates the pneumatic cylinder 131 for the gripping device 118. As a result of this actuation of the pneumatic cylinder 131 the gripping device 118 is opened.

The relay coil $d12$ also opens the relay switch $d12$ in column 41, so that, upon an activation of the reed contact $bm3$, no longer the relay $d8$ but instead the relay $d15$ will be affected. As originally mentioned, the reed contact $m3$, with a control of the relay $d8$, effected a conversion from low speed forward turning of the motor to high speed forward turning for purposes of winding. In this case, activation of reed contact $bm3$ results in energization of relay coil $d15$ in column 38 of FIG. 21. The energized relay coil $d15$ opens the corresponding relay switches $d15$ in columns 38, 53, 70, 31, 49, 61 and 66, and closes the normally open switches $d15$ in columns 38, 39, 67 and 76. Opening of switch $d15$ in column 53 disables reed contact $bm4$. Opening of switch $d17$ in column 70 deenergizes relay coil $d22$, so that, inter alia, the corresponding relay switch $d22$ in column 90 opens. As a result, the magnet valve $s3$ is actuated, so that the pneumatic cylinder 124 returns the arm 139 to the open position. The just-mentioned opening of switch $d15$ in column 31 results in deenergization of relay coil $d4a$, so that, inter alia, the relay switch $d4a$ in column $8a$ will open, thereby deenergizing relay coil $c5$ and causing motor 25 ($m^2$) to come to a halt. The abovementioned opening of switch $d\,15$ in column 49 results in an interruption of the current path of relay coil $d10$, so that relay $d10$ cannot be energized by the switch $u2$ of the counting arrangement. The abovementioned opening of switch $d15$ in column 61 deenergizes relay coil $d13$ in column 61, so that, inter alia, the relay switch $d13$ in column 96 will open. As a result, magnet valve $s6$ is actuated, and the pneumatic cylinder 131 of the gripping device 118 causes the gripping device 118 to close. Opening of switch $d15$ in column 66 deenergizes relay coil $d20$ in column 65 and deenergizes relay col $d28a$ in column 67. Deenergization of relay coil $d20$ results, inter alia, in opening of corresponding relay switch $d20$ in column 86, so that the magnet valve $s1$ is actuated. The magnet valve $s1$ thereby actuates the pneumatic cylinder 58, so that clamping members 53 move back to their disengaged position.

The abovementioned closing of the normally open one of the relay switches $d14a$ in column 38 results in a self-locking action of the relay $d15$. The abovementioned closing of relay switch $d15a$ in column 76 energizes relay coil $d24a$. The energized relay coil $d24a$ closes the corresponding relay switch $d24a$ in column 84, so that the time-delay relay coil $d24a$ is energizer. After elapse of a preselected time interval, the energized relay coil $24a$ closes the corresponding relay switch $d24a$ in column 5 of FIG. 19. Closing of switch $d24a$ in column 5 results in energization of relay coil $c2$ in column 4. The energized relay coil $c2$ closes the three ganged switches in column 2 to connect the conductors U, V, W and thereby the motor $m1$ (82) for the conveyor 69 to power. The conveyor 69 is set into motion, so that the wound rotors are transported away from the winding stations. During this transport, the conductors held in the gripping device 116 are ripped off. Simultaneously with the conveyance away of the wound rotors, yet to be wound rotors are supplied. The conveyor 69 remains in operation until a trip 180 on the conveyor 69 activates the switch 181. As already mentioned, the switch 181 shown in FIG. 1 corresponds to the switch $b16$ shown in column 21 of FIG. 20 of the circuit diagram of the control circuit. Activation of switch $b16$, as already mentioned, causes the conveyor to halt and the further operating steps to commence.

Figure 22:
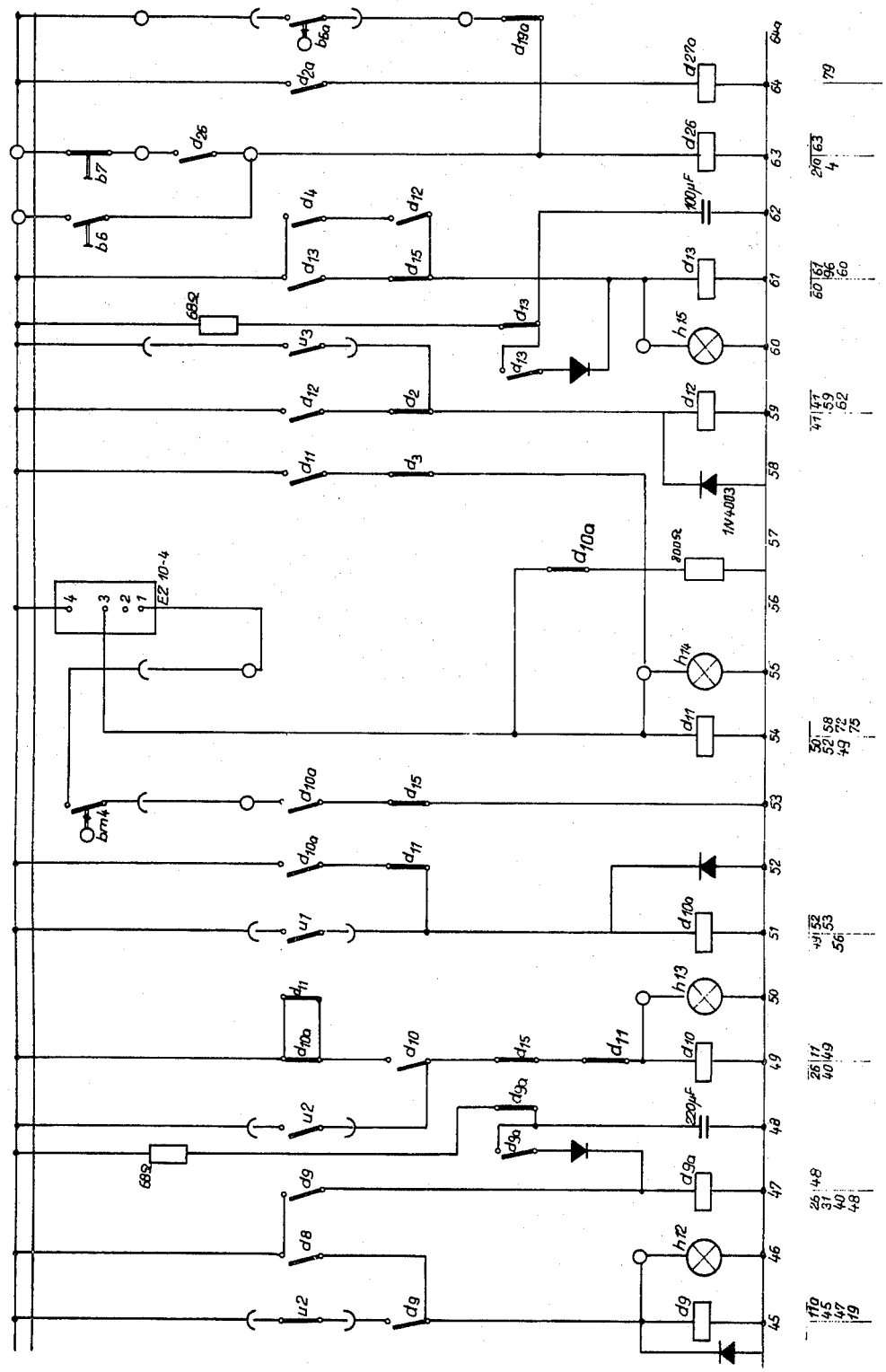

A momentary switch $b6$ in column 62 and a momentary switch $b6a$ in column $64a$ of FIG. 22 are provided, so that the arrangement can be stopped during operation. Activation of one of these two momentary switches $b6$, $b6a$ energizes relay coil $d26$ in column 63. The enrgized relay coil $d26$ opens the corresponding relay switches $d26$ in columns $21a$ and 4, and closes the relay switch $d26$ in column 63. Closing of switch $d26$ in column 63 results in a self-locking action with respect to relay $d26$. Opening of switches $d26$ in columns $21a$ and 4 results in an interruption of current flow, so that the arrangement comes to a halt. To again turn on the arrangement, the momentary switch $b7$ in column 63 of FIG. 22 is closed. Closing of momentary switch $b7$ deenergizes relay coil $d26$, so that the corresponding relay switches $d26$ in columns 4 and $21a$ again close, and the arrangement is agains supplied with current.

Furthermore, momentary switch $b8$ in column 77 of FIG. 23 is provided to cause the arrangement to come to a halt at the end of each completed operating cycle. Closing of momentary switch $b\,8$ energizes relay $d31$. The energized relay $d31$ opens the normally closed relay switches $d31$ in columns 5 and 76, and closes the normally open switch $d31$ in column 76. Closing of the lower switch $d31$ in column 76 establishes a self-locking of relay $d31$. Opening of switch $d31$ in column 5 prevents energization of relay coil $c2$ in the event that the time-delay relay $d24$ is energized. As already explained, the time-delay relay $d24$ via the relay $c2$ switches on the motor $m1$ (82) of the conveyor 69, when the completely wound rotors are to be transported away from the winding stations. closing of momentary switch in column 77 terminates the transport of the completely wound rotors away from the winding stations. The arrangement can be turned on again by closing the momentary switch $b5$ in column 20 of FIG. 20. Opening of the lower relay switch $d31a$ in column 76 deenergizes relay coil $d24a$ and accordingly relay coil $d24$.

Without further analysis, the foregoing will so fully reveal the gist of the present invention that others can, by applying current knowledge, readily adapt it for various applications without omitting features which fairly constitutes essential characteristics of the generic and specific aspects of our contribution to the art and, therefore, such adaptations should and are intended to be comprehended within the meaning and range of equivalence of the claims.

We claim:

1. Apparatus for applying windings to rotors for use in electric motors or the like and having angularly spaced peripheral slots for reception of convolutions of wire-like conductors, comprising conveyor means having a plurality of rotor-receiving holder means operative for holding a plurality of rotors having random angular orientations, said holder means being arranged to travel stepwise along an endless path and drive means for said holder means; a plurality of winding stations adjacent to a portion of said path to accommodate an equal number of rotors during intervals between stepwise movements of said holder means, and including means for automatically changing the random angular orientations of rotors arriving at said winding stations to a predetermined angular orientation; sources of conductors for each of said stations; winding members provided at said stations and operable to apply conductors furnished by the respective sources to rotors at the corresponding stations; and means for simultaneously operating said winding members so that the number of simultaneously wound rotors equals the number of said stations.

2. Apparatus as defined in claim 1, wherein said holder means are spaced from each other in the longitudinal direction of said path and said stations are spaced from each other in the longitudinal direction of said portion of said path, the distances between said stations at least approximating the distances between said holder means.

3. Apparatus as defined in claim 1, wherein the total number of said holder means is a whole multiple of the total number of said stations.

4. Apparatus as defined in claim 1, further comprising gripping devices for wire-like conductors at said winding stations.

5. Apparatus as defined in claim 4, wherein each of said gripping devices comprises a first jaw and a second jaw movable into and from engagement with a conductor extending between said jaws.

6. Apparatus as defined in claim 5, wherein one of said jaws is provided with a convex serrated surface and the other jaw is provided with a concave serrated surface complementary to said convex surface, said surface engaging the conductor coming from the respective source in response to movement of said second jaw toward said first jaw.

7. Apparatus as defined in claim 5, wherein said first jaws are stationary and said second jaws are pivotable with reference to the respective first jaws.

8. Apparatus as defined in claim 1, further comprising a conductor guide provided at each of said stations and movable to and from an operative position in which the guide directs the conductor into selected slots of the rotor at the respective station during operation of the corresponding winding member.

9. Apparatus as defined in claim 8, wherein said guides are turnable to and from said operative positions thereof.

10. Apparatus as defined in claim 1, wherein said winding stations form a single row and said holder means are movable in a substantially horizontal plane.

11. Apparatus as defined in claim 10, wherein a portion of said conveyor means constitutes a magazine for fresh rotors wherein such fresh rotors can be attached to unoccupied holder means preparatory to transport to said winding stations.

12. Apparatus for applying windings to rotors for use in electric motors or the like and having angularly spaced peripheral slots for reception of convolutions of wire-like conductors, comprising conveyor means having a plurality of rotor-receiving holder means arranged to travel stepwise along an endless path and drive means for said holder means; a plurality of winding stations adjacent to a portion of said path to accommodate an equal number of rotors during intervals between stepwise movements of said holder means; sources of conductors for each of said stations; winding members provided at said stations and operable to apply conductors furnished by the respective sources to rotors at the corresponding stations; and means for simultaneously operating said winding members so that the number of simultaneously wound rotors equals the number of said stations, wherein said drive means comprises an endless chain and said holder means are secured to said chain and are equidistant from each other, each of said holder means having receiving means for a rotor.

13. Apparatus as defined in claim 12, wherein said drive means further comprises a pair of sprocket wheels and means for rotating one of said sprocket wheels, said chain being trained over said sprocket wheels and having two straight elongated stretches extending between said sprocket wheels, said stations being adjacent to one of said stretches.

14. Apparatus as defined in claim 13, wherein said conveyor means further comprises a pair of substantially platelike confining members defining between themselves a space for said chain.

15. Apparatus as defined in claim 14, wherein said confining members are disposed in substantially horizontal planes and one thereof is located above the other confining member.

16. Apparatus as defined in claim 14, wherein said holder means extend outwardly from said chain so that said receiving means are accessible without said confining members.

17. Apparatus as defined in claim 12, wherein said receiving means are substantially vertical sleeves installed in sockets provided therefore in said holder means, the rotors having shafts which are receivable in such sleeves.

18. Apparatus as defined in claim 17, wherein the rotors whose shafts are receivable in said sleeves further comprise commutators remote from those portions of said shafts which are received in said sleeves.

19. Apparatus as defined in claim 12, wherein said drive means further comprises electric motor means for moving said chain stepwise and said chain is provided with a plurality of equidistant actuating means for switch means in the circuit of said motor means, said switch means being arranged to arrest said electric motor means upon engagement with successive actuating means to thereby stop said chain in predetermined positions in each of which a set of fresh rotors is located at said stations.

20. Apparatus as defined in claim 14, wherein said drive means further comprises a pair of sprocket wheels for said chain and means for rotating one of said sprocket wheels, said conveyor means further comprising a pair of confining members flanking said chain from above and from below and said holder means extending outwardly from said chain beyond said confining members so that said receiving means thereof are readily accessible, and further comprising a back support mounted on said confining members at each of said stations, a clamping member provided at each of said stations opposite the respective back support, and shifting means for moving said clamping members toward the respective back support to thereby clampingly engage rotors which are accommodated at the respective stations.

21. Apparatus as defined in claim 20, wherein said stations form a row of equidistant stations and said chain has an elongated stretch which is adjacent to said row of stations, said confining members including an upper member located above and a lower member located below said chain and said back supports being disposed at a level above said upper confining member.

22. Apparatus as defined in claim 20, wherein each of said clamping members has a socket bounded by a concave surface arranged to engage a complementary portion of the peripheral surface on the rotor at the respective station.

23. Apparatus as defined in claim 22, wherein said back supports are provided with substantially flat rotor-engaging surfaces.

24. Apparatus as defined in claim 22, wherein said clamping members are further provided with guide faces flanking said concave surfaces thereof and arranged to direct conductors into selected slots of rotors at the respective stations in the course of the operation of the respective winding members.

25. Apparatus for applying windings to rotors for use in electric motors or the like and having angularly spaced peripheral slots for reception of convolutions of wire-like conductors, comprising conveyor means having a plurality of rotor-receiving holder means arranged to travel stepwise along an endless path and drive means for said holder means; a plurality of winding stations adjacent to a portion of said path to accommodate an equal number of rotors during intervals between stepwise movements of said holder means; sources of conductors for each of said stations; winding members provided at said stations and operable to apply conductors furnished by the respective sources to rotors at the corresponding stations; and means for simultaneously operating said winding members so that the number of simultaneously wound rotors equals the number of said stations, further comprising a stationary back support provided at each of said stations, a clamping member provided at each of said stations opposite the respective back support, and shifting means for moving said clamping members toward the respective back supports to thereby clampingly engage and hold the rotors at the respective stations.

26. Apparatus as defined in claim 25, further comprising a frame and a plurality of parallel winding shafts rotatably mounted in said frame, one for each of said stations and each rotatably supporting the responsive clamping member, said shifting means being arranged to move said clamping members by way of the respective winding shafts.

27. Apparatus as defined in claim 26, wherein said shifting means comprises an elongated shifting member having holes for said winding shafts and energy storing resilient means interposed between said shifting member and said shafts to yieldably urge said clamping members against the rotors at the respective stations when said shifting member is moved in a direction toward said back supports.

28. Apparatus as defined in claim 27, further comprising fluid-operated motor means for moving said shifting member lengthwise of said shafts.

29. Apparatus as defined in claim 26, wherein said winding shafts are hollow and the conductors extend through the respective shafts from said sources to the winding members at the respective stations, each of said winding members comprising an arm rotatable by the respective winding shaft, said means for simultaneously operating said winding members including means for rotating said winding shafts.

30. Apparatus as defined in claim 29, wherein each of said arms has a portion remote from the respective winding shaft and a conductor-guiding wheel mounted on such portion.

31. Apparatus as defined in claim 26, wherein said means for simultaneously operating said winding members comprises a single prime mover and transmission means including toothed belt means connecting said prime mover with said winding shafts.

32. Apparatus as defined in claim 25, further comprising means for indexing the rotors at said winding stations, including an elongated indexing member reciprocably guided by said back supports and having entraining means extendable into the slots of rotors at said stations to index such rotors in response to movement of said indexing member in a predetermined direction.

33. Apparatus as defined in claim 32, wherein said entraining means are spring-biased pawls pivotably mounted on said indexing member and having pallets which extend into the slots of rotors at said stations during movement of said indexing member in said predetermined direction and are free to leave such slots in response to movement of said indexing member in a second direction counter to said predetermined direction.

34. Apparatus as defined in claim 33, wherein said indexing member is provided with recesses for said pawls, said pawls being fully received in such recesses during movement of said indexing member in said second direction and the pallets of said pawls extending from such recesses and into the adjoining slots of rotors at the respective stations during movement of said indexing member in said predetermined direction.

35. Apparatus as defined in claim 33, further comprising fluid-operated motor means for moving said indexing member in said directions.

36. Apparatus as defined in claim 32, further comprising yieldable detent means provided in said clamping members and arranged to extend into the adjoining slots of rotors at the respective stations upon completed movement of said indexing member in said predetermined direction.

37. Apparatus for applying windings to rotors for use in electric motors or the like and having angularly spaced peripheral slots for reception of convolutions of wire-like conductors, comprising conveyor means having a plurality of rotor-receiving holder means arranged to travel stepwise along an endless path and drive means for said holder means; a plurality of winding stations adjacent to a portion of said path to accommodate an equal number of rotors during intervals between stepwise movements of said holder means; sources of conductors for each of said stations; winding members provided at said stations and operable to apply conductors furnished by the respective sources to rotors at the corresponding stations; and means for simultaneously operating said winding members so that the number of simultaneously wound rotors equals the number of said stations, further comprising gripping devices for wire-like conductors at said winding stations, wherein each of said gripping devices comprises a first jaw and a second jaw movable into and from engagement with a conductor extending between said jaws, wherein said conveyor means further comprises an endless flexible element which supports said holder means and first and second confining members respectively flanking said flexible element from above and from below, said gripping devices being disposed below said second confining member and further comprising rack and pinion means for moving said second jaws of said gripping devices with reference to said first jaws.

38. Apparatus as defined in claim 37, wherein said rack and pinion means comprises a common rack for all of said gripping devices.

\* \* \* \* \*